US010829265B2

(12) United States Patent
Balazs et al.

(10) Patent No.: US 10,829,265 B2
(45) Date of Patent: *Nov. 10, 2020

(54) STRAIGHT CONSISTENT BODY SCORES ON PLASTIC CORRUGATED BOXES AND A PROCESS FOR MAKING SAME

(71) Applicant: ORBIS Corporation, Oconomowoc, WI (US)

(72) Inventors: Donald J. Balazs, Oconomowoc, WI (US); William F. McMahon, Hartford, WI (US)

(73) Assignee: ORBIS Corporation, Oconomowoc, WI (US)

( * ) Notice: Subject to any disclaimer, the term of this patent is extended or adjusted under 35 U.S.C. 154(b) by 297 days.

This patent is subject to a terminal disclaimer.

(21) Appl. No.: 15/498,625

(22) Filed: Apr. 27, 2017

(65) Prior Publication Data

US 2017/0291731 A1    Oct. 12, 2017

Related U.S. Application Data

(63) Continuation-in-part of application No. 14/580,810, filed on Dec. 23, 2014.

(Continued)

(51) Int. Cl.
*B65D 5/42*    (2006.01)
*B65D 5/36*    (2006.01)
(Continued)

(52) U.S. Cl.
CPC .......... *B65D 5/4266* (2013.01); *B29C 53/063* (2013.01); *B29C 67/0044* (2013.01); *B65D 5/3621* (2013.01); *B65D 11/16* (2013.01); *B65D 11/186* (2013.01); *B65D 11/24* (2013.01); *B29C 35/0261* (2013.01); *B29L 2031/60* (2013.01); *B29L 2031/7162* (2013.01); *B31B 50/20* (2017.08); *B31B 50/22* (2017.08); *B31B 50/256* (2017.08); *B31B 50/624* (2017.08);
(Continued)

(58) Field of Classification Search
CPC .... B65D 5/4266; B65D 5/3621; B65D 11/16; B65D 11/186; B65D 11/24
USPC ...... 229/198.2, 5.81, 5.84; 428/182; 493/51, 493/52, 60, 69, 463

See application file for complete search history.

(56) References Cited

U.S. PATENT DOCUMENTS 1,101,927 A    6/1914    Hawkins et al.
1,733,566 A    10/1929   Weaver
(Continued)

FOREIGN PATENT DOCUMENTS

CA    2935978 A1    4/2013
CA    2961959 A1    4/2016
(Continued)

OTHER PUBLICATIONS

The International Bureau of WIPO, International Preliminary Report on Patentability for PCT/US2012/038316, dated Apr. 15, 2014, 9 pages.
(Continued)

*Primary Examiner* — Christopher R Demeree
(74) *Attorney, Agent, or Firm* — Greensfelder, Hemker & Gale, P.C.; Richard C. Himelhoch

(57) ABSTRACT

The invention is directed to straight, consistent body scores on plastic corrugated boxes and a process for making the body scores.

19 Claims, 36 Drawing Sheets

Related U.S. Application Data

(60) Provisional application No. 61/920,570, filed on Dec. 24, 2013, provisional application No. 62/461,554, filed on Feb. 21, 2017.

(51) Int. Cl.

| | | |
|---|---|---|
| *B65D 6/38* | (2006.01) | |
| *B65D 6/18* | (2006.01) | |
| *B65D 6/10* | (2006.01) | |
| *B29C 67/00* | (2017.01) | |
| *B29C 53/06* | (2006.01) | |
| *B31B 110/35* | (2017.01) | |
| *B31B 50/22* | (2017.01) | |
| *B31B 100/00* | (2017.01) | |
| *B31B 50/62* | (2017.01) | |
| *B29L 31/60* | (2006.01) | |
| *B31B 50/64* | (2017.01) | |
| *B31B 50/20* | (2017.01) | |
| *B29C 35/02* | (2006.01) | |
| *B31B 120/30* | (2017.01) | |
| *B29L 31/00* | (2006.01) | |
| *B31B 50/25* | (2017.01) | |

(52) U.S. Cl.
CPC .......... *B31B 50/64* (2017.08); *B31B 2100/00* (2017.08); *B31B 2100/0022* (2017.08); *B31B 2110/35* (2017.08); *B31B 2120/30* (2017.08)

(56) References Cited

U.S. PATENT DOCUMENTS

| | | | |
|---|---|---|---|
| 2,533,773 A | | 12/1950 | De La Foret |
| 2,751,136 A | * | 6/1956 | Moore ............... B65D 5/4266 229/131 |
| 3,199,763 A | * | 8/1965 | Anderson ........... B65D 5/4266 229/126 |
| 3,203,288 A | | 8/1965 | Blumer |
| 3,349,446 A | | 10/1967 | Haygeman |
| 3,406,052 A | | 10/1968 | Peters |
| 3,414,184 A | | 12/1968 | Loheed |
| 3,562,041 A | | 2/1971 | Robertson |
| 3,611,884 A | | 10/1971 | Hottendorf |
| 3,687,170 A | | 8/1972 | Malone et al. |
| 3,727,825 A | * | 4/1973 | Troth ..................... B65D 5/22 206/806 |
| 3,727,826 A | | 4/1973 | Shepherd |
| 3,796,307 A | | 3/1974 | McKinney |
| 3,883,065 A | | 5/1975 | Presnick |
| 3,884,132 A | | 5/1975 | Snodgrass |
| 3,907,193 A | | 9/1975 | Heller |
| 3,973,721 A | | 8/1976 | Nakane |
| 3,977,310 A | | 8/1976 | Keck et al. |
| 3,981,213 A | | 9/1976 | Lopman |
| 4,027,058 A | | 5/1977 | Wootten |
| 4,090,903 A | | 5/1978 | Matsui |
| 4,106,623 A | | 8/1978 | Carroll et al. |
| 4,121,754 A | | 10/1978 | Hackenberg |
| 4,239,150 A | | 12/1980 | Schadowski et al. |
| 4,267,223 A | * | 5/1981 | Swartz ................... B29C 65/18 428/172 |
| 4,313,547 A | | 2/1982 | Osborne |
| 4,348,449 A | | 9/1982 | Seufert |
| 4,356,053 A | | 10/1982 | LoMaglio |
| 4,415,515 A | | 11/1983 | Rosenberg |
| 4,441,948 A | | 4/1984 | Gillard et al. |
| 4,477,013 A | | 10/1984 | Herrin |
| 4,477,522 A | | 10/1984 | Sheehan |
| 4,482,417 A | | 11/1984 | Hulber et al. |
| 4,507,348 A | | 3/1985 | Nagata et al. |
| 4,515,648 A | | 5/1985 | Kolbe et al. |
| 4,517,790 A | | 5/1985 | Kreager |
| 4,535,929 A | | 8/1985 | Sherman, II et al. |
| 4,559,259 A | | 12/1985 | Cetrelli |
| 4,596,541 A | | 6/1986 | Ward, Sr. et al. |
| 4,601,407 A | | 7/1986 | Gillard |
| 4,604,083 A | | 8/1986 | Barny et al. |
| 4,605,454 A | | 8/1986 | Sayovitz et al. |
| 4,655,389 A | | 4/1987 | Marsh |
| 4,767,393 A | | 8/1988 | Smith |
| 4,865,201 A | | 9/1989 | Liebel |
| 4,906,510 A | | 3/1990 | Todor, Jr. et al. |
| 4,938,413 A | | 7/1990 | Wolfe |
| 4,946,430 A | | 8/1990 | Kohmann |
| 4,948,039 A | * | 8/1990 | Amatangelo ............ B65D 5/20 229/198 |
| 4,960,207 A | | 10/1990 | Tabler et al. |
| 5,012,930 A | | 5/1991 | Hansen |
| 5,021,042 A | | 6/1991 | Resnick et al. |
| 5,054,265 A | | 10/1991 | Perigo et al. |
| 5,114,034 A | | 5/1992 | Miller et al. |
| 5,158,525 A | | 10/1992 | Nikkel |
| 5,163,609 A | | 11/1992 | Muise, Jr. |
| 5,183,672 A | | 2/1993 | Fetterhoff et al. |
| 5,190,213 A | | 3/1993 | Horwitz |
| 5,202,065 A | | 4/1993 | Lenander et al. |
| 5,232,149 A | | 8/1993 | Stoll |
| 5,255,842 A | | 10/1993 | Rosen |
| 5,268,138 A | | 12/1993 | Fetterhoff et al. |
| 5,304,056 A | | 4/1994 | Fetterhoff |
| 5,351,846 A | * | 10/1994 | Carter .................... B65D 11/16 220/4.29 |
| 5,356,696 A | | 10/1994 | Fetterhoff |
| 5,384,002 A | | 1/1995 | Leatherman et al. |
| 5,466,211 A | | 11/1995 | Komarek et al. |
| 5,497,939 A | | 3/1996 | Heiskell et al. |
| 5,501,758 A | | 3/1996 | Nitardy |
| 5,503,324 A | | 4/1996 | Bacchetti et al. |
| 5,533,956 A | | 7/1996 | Komarek et al. |
| 5,564,623 A | | 10/1996 | Kiley |
| 5,597,111 A | | 1/1997 | Mackinnon et al. |
| 5,642,854 A | | 7/1997 | Hatton |
| 5,658,644 A | | 8/1997 | Ho et al. |
| 5,681,422 A | | 10/1997 | Marschke |
| 5,733,411 A | | 3/1998 | Bett |
| 5,873,807 A | | 2/1999 | Lauderbaugh et al. |
| 5,881,902 A | | 3/1999 | Ackermann |
| 5,887,782 A | | 3/1999 | Mueller |
| 5,908,135 A | | 6/1999 | Bradford et al. |
| 5,913,766 A | | 6/1999 | Reed et al. |
| 5,924,627 A | | 7/1999 | Wilder et al. |
| 5,965,238 A | | 10/1999 | Saitoh et al. |
| 6,007,470 A | | 12/1999 | Komarek et al. |
| 6,039,101 A | | 3/2000 | MacKinnon |
| 6,056,840 A | | 5/2000 | Mills et al. |
| 6,071,225 A | | 6/2000 | Kucharski |
| 6,102,279 A | | 8/2000 | Dowd |
| 6,102,280 A | | 8/2000 | Dowd |
| 6,120,629 A | | 9/2000 | Shannon et al. |
| 6,138,903 A | | 10/2000 | Baker |
| 6,159,137 A | | 12/2000 | Lee et al. |
| 6,203,482 B1 | | 3/2001 | Sandford |
| 6,228,234 B1 | | 5/2001 | Oshima et al. |
| 6,257,484 B1 | | 7/2001 | Dowd |
| 6,338,234 B1 | | 1/2002 | Muise et al. |
| 6,349,876 B1 | | 2/2002 | Dowd |
| 6,450,398 B1 | | 9/2002 | Muise et al. |
| 6,572,519 B1 | | 6/2003 | Harris |
| 6,578,759 B1 | | 6/2003 | Ortiz |
| 6,592,711 B1 | | 7/2003 | Kubik |
| 6,655,434 B2 | | 12/2003 | Danko |
| 6,676,010 B1 | | 1/2004 | Roseth et al. |
| 6,689,033 B2 | | 2/2004 | Plemons et al. |
| 6,705,515 B2 | | 3/2004 | Dowd |
| 6,719,191 B1 | * | 4/2004 | Christensen ......... B65D 5/0075 206/509 |
| 6,759,114 B2 | | 7/2004 | Wu et al. |
| 6,761,307 B2 | | 7/2004 | Matsuoka |
| 6,902,103 B2 | | 6/2005 | Machery |
| 6,926,192 B1 | | 8/2005 | Dowd |
| 6,938,818 B2 | * | 9/2005 | Moorman ................ B65D 5/10 229/120 |

(56) References Cited

U.S. PATENT DOCUMENTS

| | | |
|---|---|---|
| 6,994,662 B2 | 2/2006 | Jornborn et al. |
| 7,025,841 B2 | 4/2006 | Owen |
| 7,028,834 B2 | 4/2006 | Karpel |
| 7,069,856 B2 | 7/2006 | Hartka et al. |
| 7,326,168 B2 | 2/2008 | Kocherga et al. |
| 7,384,497 B2 | 6/2008 | Christensen et al. |
| D608,634 S | 1/2010 | Riedi |
| 7,640,662 B2 | 1/2010 | Haglid |
| 7,670,275 B2 | 3/2010 | Schaack |
| 7,682,300 B2 | 3/2010 | Graham et al. |
| 7,726,480 B2 | 6/2010 | Nazari |
| 7,870,992 B2 | 1/2011 | Schille et al. |
| 7,886,503 B2 | 2/2011 | Chase et al. |
| 7,951,252 B2 | 5/2011 | Danko |
| 8,418,912 B1 | 4/2013 | Goodrich |
| 8,662,133 B2 | 3/2014 | Ninomiya et al. |
| 8,662,378 B2 | 3/2014 | Mehta |
| 8,864,017 B2 | 10/2014 | McMahon |
| 9,126,711 B2 | 9/2015 | Hermosillo et al. |
| 9,302,806 B2 | 4/2016 | Perkins |
| 9,555,918 B2 | 1/2017 | McMahon |
| 9,604,750 B2 | 3/2017 | McMahon et al. |
| 9,630,739 B2 | 4/2017 | McMahon et al. |
| 10,392,153 B2 | 8/2019 | Mehta |
| 2001/0022211 A1 | 9/2001 | Walsh |
| 2001/0027992 A1 | 10/2001 | Strong |
| 2001/0046584 A1 | 11/2001 | Danko |
| 2002/0007607 A1 | 1/2002 | Matlack et al. |
| 2002/0011513 A1 | 1/2002 | Dowd |
| 2002/0026742 A1 | 3/2002 | Washington |
| 2002/0125594 A1 | 9/2002 | Sung et al. |
| 2003/0010817 A1 | 1/2003 | Lingle et al. |
| 2003/0102361 A1 | 6/2003 | Terashima et al. |
| 2003/0127773 A1 | 7/2003 | Feistel et al. |
| 2003/0215613 A1 | 11/2003 | Jan et al. |
| 2003/0235660 A1 | 12/2003 | Blanchard |
| 2004/0222542 A1 | 11/2004 | Jan et al. |
| 2004/0248717 A1 | 12/2004 | Calugi |
| 2005/0006446 A1 | 1/2005 | Stafford, Jr. |
| 2005/0067477 A1 | 3/2005 | McClure |
| 2005/0150244 A1 | 7/2005 | Hillmann et al. |
| 2005/0202215 A1 | 9/2005 | Temple, II et al. |
| 2005/0209076 A1 | 9/2005 | Boutron et al. |
| 2006/0089071 A1 | 4/2006 | Leidig et al. |
| 2006/0169757 A1 | 8/2006 | McDowell |
| 2007/0069428 A1 | 3/2007 | Pfaff et al. |
| 2007/0228129 A1 | 10/2007 | Habeger, Jr. et al. |
| 2007/0241900 A1 | 10/2007 | Sasazaki |
| 2008/0003869 A1 | 1/2008 | Wu et al. |
| 2008/0003870 A1 | 1/2008 | Wu et al. |
| 2008/0247682 A1 | 10/2008 | Murray |
| 2009/0011173 A1 | 1/2009 | Thiagarajan |
| 2010/0078466 A1 | 4/2010 | Stack, Jr. et al. |
| 2010/0105534 A1 | 4/2010 | Nazari |
| 2010/0147840 A1 | 6/2010 | Dowd |
| 2011/0069911 A1 | 3/2011 | Ackerman et al. |
| 2011/0101081 A1 | 5/2011 | Dowd et al. |
| 2011/0303740 A1 | 12/2011 | Schuld |
| 2012/0118880 A1 | 5/2012 | Wnek |
| 2013/0048704 A1 | 2/2013 | Lewis et al. |
| 2013/0055407 A1 | 2/2013 | Hirayama et al. |
| 2013/0092726 A1* | 4/2013 | McMahon ............ B65D 5/4266 229/126 |
| 2014/0231496 A1 | 8/2014 | McMahon |
| 2014/0231497 A1 | 8/2014 | McMahon |
| 2014/0367458 A1 | 12/2014 | Smith |
| 2014/0367459 A1 | 12/2014 | Smith |
| 2014/0374303 A1 | 12/2014 | Martinez |
| 2015/0174849 A1 | 6/2015 | McMahon et al. |
| 2015/0174850 A1 | 6/2015 | McMahon et al. |
| 2015/0175297 A1 | 6/2015 | McMahon et al. |
| 2015/0175298 A1 | 6/2015 | McMahon et al. |
| 2015/0210421 A1 | 7/2015 | Whittles et al. |
| 2016/0096651 A1 | 4/2016 | Klein |
| 2016/0102196 A1 | 4/2016 | Dodd |
| 2017/0066214 A1 | 3/2017 | Polikov |
| 2017/0291731 A1 | 10/2017 | Balazs et al. |
| 2018/0105316 A1 | 4/2018 | McMahon et al. |
| 2018/0362207 A1 | 12/2018 | McMahon et al. |
| 2019/0300210 A1 | 10/2019 | Ponti |

FOREIGN PATENT DOCUMENTS

| | | |
|---|---|---|
| CA | 2851357 C | 8/2016 |
| CA | 3028971 A1 | 12/2017 |
| DE | 9110957 U1 | 11/1991 |
| DE | 9110957 U1 | 12/1991 |
| DE | 102010041663 A1 | 3/2012 |
| EP | 0054856 A1 | 6/1982 |
| EP | 0330228 A2 | 2/1989 |
| EP | 0330228 A3 | 2/1989 |
| EP | 0399657 A1 | 11/1990 |
| EP | 0459672 A1 | 12/1991 |
| EP | 0535998 A1 | 4/1993 |
| EP | 0566338 A1 | 10/1993 |
| EP | 0731233 A1 | 9/1996 |
| EP | 1488912 A1 | 12/2004 |
| EP | 1880947 A2 | 1/2008 |
| EP | 1787801 B1 | 8/2009 |
| EP | 1799432 B1 | 1/2010 |
| EP | 2766269 | 8/2014 |
| EP | 2766269 B1 | 12/2016 |
| EP | 3170759 A1 | 5/2017 |
| EP | 3170760 A1 | 5/2017 |
| EP | 3089917 B1 | 6/2018 |
| GB | 1593730 A | 7/1981 |
| GB | 2199017 A | 6/1988 |
| GB | 2249520 A | 5/1992 |
| GB | 2271095 A | 4/1994 |
| GB | 2276120 A | 9/1994 |
| GB | 2299048 A | 9/1996 |
| JP | S597014 A | 1/1984 |
| JP | 3266630 A | 11/1991 |
| JP | 5146996 A | 6/1993 |
| JP | 08-085148 A | 4/1996 |
| JP | 2003340936 A | 5/2002 |
| JP | 2003062917 A | 3/2003 |
| JP | 2003104361 A | 4/2003 |
| JP | 2005343554 A | 12/2005 |
| JP | 2006001136 A | 1/2006 |
| JP | 2009006556 A | 1/2009 |
| KR | 20020006235 A | 1/2002 |
| KR | 20100137130 A | 12/2010 |
| KR | 10-2016-0054489 | 5/2016 |
| MX | 9503047 | 2/1997 |
| MX | 343734 B | 11/2016 |
| MX | 2017004472 A | 6/2017 |
| MX | 353612 B | 1/2018 |
| TW | 356126 | 4/1999 |
| TW | 416925 B | 1/2001 |
| TW | 200619094 | 6/2006 |
| TW | 306060 B | 2/2009 |
| TW | 201345796 A | 11/2013 |
| TW | I555683 B | 11/2016 |
| TW | 201716293 A | 5/2017 |
| TW | 201716294 A | 5/2017 |
| TW | I600591 B | 10/2017 |
| TW | I600592 B | 10/2017 |
| WO | 9309032 A1 | 5/1993 |
| WO | 2005120965 A1 | 12/2005 |
| WO | 2006034502 A1 | 3/2006 |
| WO | 2007105964 A1 | 9/2009 |
| WO | 2010049880 A2 | 5/2010 |
| WO | 2012055429 A1 | 5/2012 |
| WO | 2013055407 A1 | 4/2013 |
| WO | 2015100249 A2 | 7/2015 |
| WO | 2016057256 A1 | 4/2016 |
| WO | 2017223392 A1 | 12/2017 |

(56) References Cited

FOREIGN PATENT DOCUMENTS

| | | |
|---|---|---|
| WO | 2018156604 A1 | 8/2018 |
| WO | 2018236801 A1 | 12/2018 |

OTHER PUBLICATIONS

European Patent Office, Extended European Search Report for EP 18174415.2, dated Mar. 26, 2019, 7 pages.
European Patent Office, International Search Report for PCT/US2012/038316, dated Aug. 2, 2012, 5 pages.
European Patent Office, Extended European Search Report for EP 15849285.0, dated Feb. 7, 2018, 8 pages.
European Patent Office, Written Opinion of International Searching Authority for PCT/US2012/038316, dated Aug. 2, 2012, 8 pages.
Tri-Pack Plastics Ltd.; Web pages for "Chilled Foods," "Polypropylene Packaging," "Tree Tubes," "Transit Packaging," and "Returnable Post"; retrieved Jan. 18, 2010 from <http://www.tri-pack.co.uk/> and related sites, 9 pages.
Wikipedia article: "Corrugated Fiberboard"; retrieved from <http://en.wikipedia.org/w/index.php?title=Corrugated_fiberboard&oldid=648589914> on Mar. 3, 2015, 7 pages.
European Patent Office, Partial International Search Report for PCT/US2014/071926 dated Apr. 28, 2015, 5 pages.
European Patent Office, International Search Report for PCT/US2014/071926 dated Jun. 30, 2015, 6 pages.
Taiwanese Patent Office, Search Report for Taiwanese Application No. 101137741, dated Jun. 23, 2016, 1 page, with English translation.
European Patent Office, Extended European Search Report for EP 16204731.0, dated Feb. 3, 2017, 9 pages.
European Patent Office, Extended European Search Report for EP 16204728.6, dated Feb. 3, 2017, 10 pages.
Taiwanese Intellectual Property Office, Office Action and Search Report for TW Application No. 105123775, dated Mar. 8, 2017, with English translation, 5 pages.
Taiwanese Intellectual Property Office, Office Action and Search Report for TW Application No. 105123777, dated Mar. 8, 2017, with English translation, 5 pages.
European Patent Office, Written Opinion of the International Searching Authority for PCT/US2014/071926, dated Jun. 30, 2015, 6 pages.
The International Bureau of WIPO, International Preliminary Report on Patentability for PCT/US2014/071926, dated Jun. 28, 2016, 7 pages.
The International Bureau of WIPO, International Preliminary Report on Patentability for PCT/US2015/052618, dated Apr. 11, 2017, 5 pages.
Russia's Federal Institute of Industrial Property, Written Opinion of the International Searching Authority for PCT/US2015/052618, dated Feb. 18, 2016, 4 pages.
Russia's Federal Institute of Industrial Property, International Search Report for PCT/US2015/052618, dated Feb. 18, 2016, 2 pages.
European Patent Office; Communication Pursuant to Article 94(3) EPC for EP 14825566.4, dated Dec. 12, 2017, 5 pages.
Taiwanese Intellectual Property Office, Office Action and Search Report for TW Application No. 104132707, dated Jan. 24, 2019, with English translation, 9 pages.
Korean Intellectual Property Office, International Search Report for PCT/US20171038912, dated Oct. 27, 2017, 3 pages.
Korean Intellectual Property Office, Written Opinion of the International Searching Authority for PCT/US2017/038912, dated Oct. 27, 2017, 9 pages.
The International Bureau of WIPO, International Preliminary Report on Patentability for PCT/US2017/038912, dated Dec. 25, 2018, 10 pages.
Korean Intellectual Property Office, International Search Report for PCT/US2018/018983, dated Jun. 21, 2018, 5 pages.
Korean Intellectual Property Office, Written Opinion of the International Searching Authority for PCT/US2018/018983, dated Jun. 21, 2018, 8 pages.
Korean Intellectual Property Office, International Search Report for PCT/US2018/038182, dated Oct. 17, 2018, 3 pages.
Korean Intellectual Property Office, Written Opinion of the International Searching Authority for PCT/US2018/038182, dated Oct. 17, 2018, 6 pages.
European Patent Office, Communication pursuant to Article 94(3) EPC in European Application No. 15849285.0, dated Nov. 18, 2019, 6 pages.
European Patent Office, Extended European Search Report in European Application No. 17816258.2, dated Oct. 18, 2019, 12 pages.
European Patent Office, Communication pursuant to Article 94(3) EPC for European Application No. 17816258.2, dated Jul. 24, 2020, 5 pages.

\* cited by examiner

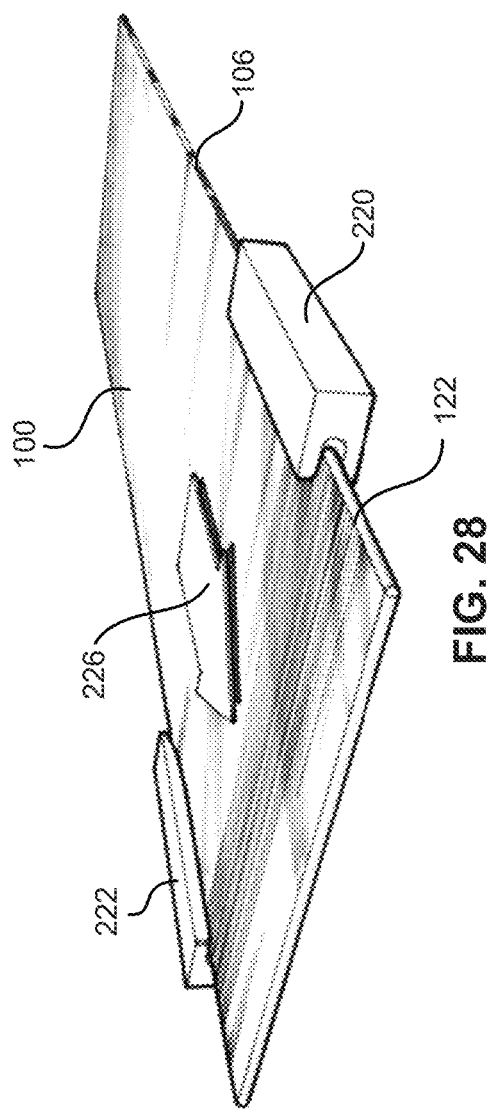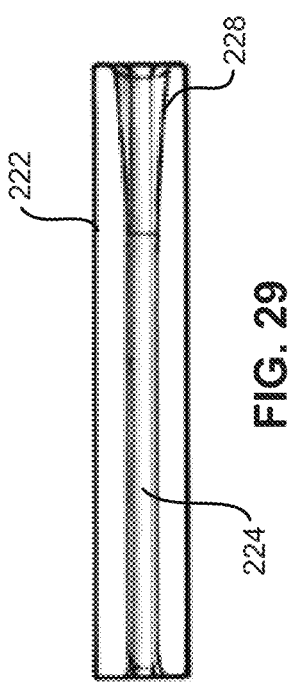

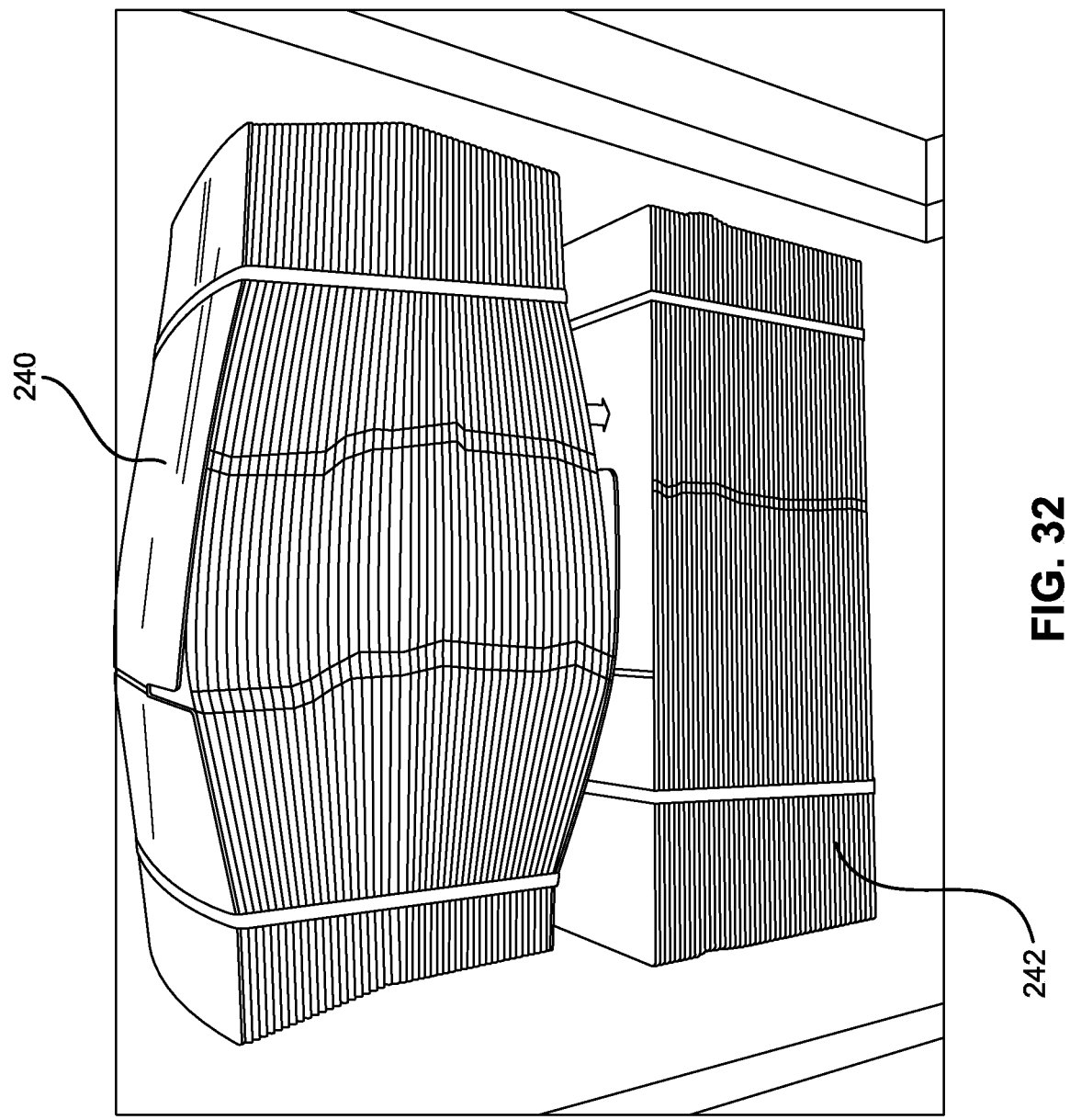

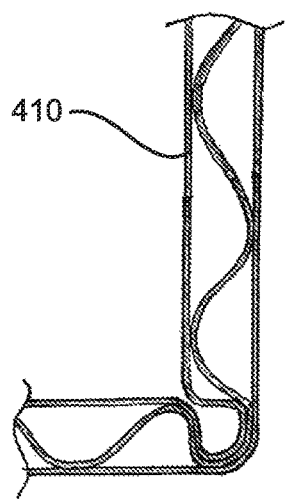
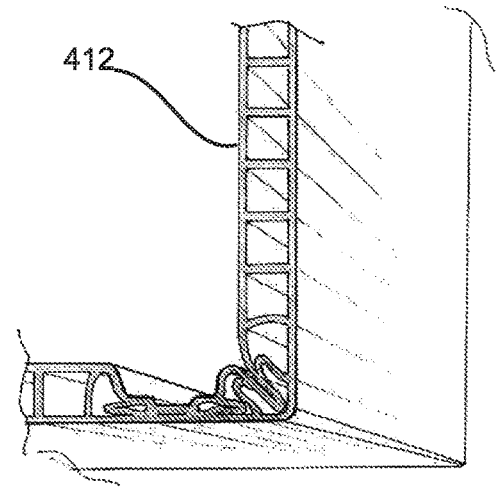
FIG. 39a    FIG. 39b
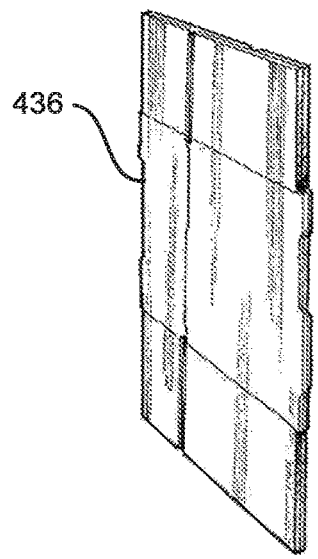
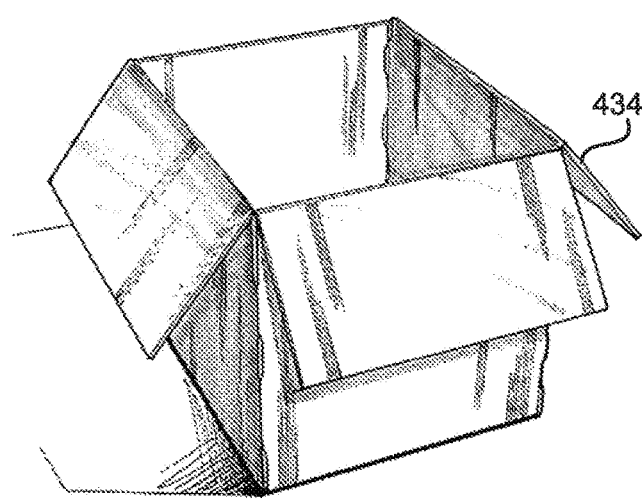
FIG. 40

STRAIGHT CONSISTENT BODY SCORES ON PLASTIC CORRUGATED BOXES AND A PROCESS FOR MAKING SAME

CROSS-REFERENCE TO RELATED APPLICATIONS

The present application is a continuation-in-part of concurrently pending U.S. patent application Ser. No. 14/580,810, filed Dec. 23, 2014 (U.S. Publication No. 2015/0174849), and claims the benefit of U.S. Provisional Application No. 62/461,554 filed Feb. 21, 2017, and U.S. Provisional Application No. 61/920,570 filed Dec. 23, 2013, the contents of which are incorporated herein by reference.

FEDERALLY SPONSORED RESEARCH OR DEVELOPMENT

N/A

FIELD OF THE INVENTION

The present invention is directed to straight, consistent body scores (i.e., fold lines) on plastic corrugated boxes and a process for making such body scores.

DESCRIPTION OF THE PRIOR ART

The machinery, die boards, and processes for converting paper corrugated blanks into boxes have been refined over more than 100 years. Those boxes are commonly used by consumer products companies in automated packaging lines that require the squareness and consistency of quality corrugated boxes. With the introduction of plastic profile board (plastic corrugated material) over 40 years ago, there have been many attempts to produce plastic boxes that would work with the same packaging lines (and equipment) as paper corrugated material, and be capable of being used multiple times. This has not been done with consistency, in part, because of the challenge of producing quality body scores.

Producing plastic corrugated boxes that perform similarly to paper corrugated boxes has several challenges. The inherent memory of plastic and the different profile of paper corrugated and plastic profile board specifically result in making it difficult to produce boxes with body scores that has: a) straight body scores, b) square corners, and c) consistent forces required to automatically open a box.

The present invention provides an improved plastic corrugated box having straight body scores and fold lines, and a process for forming the box.

SUMMARY OF THE INVENTION

The present invention provides a straight body score line for a plastic corrugated box or container, and a process for forming the straight body score. That is, the present invention provides process for imparting straight, consistent, body scores in plastic corrugated material so that when the die cut blank is formed and glued into a box, the four corners of the box will fold in the intended location and the resultant box and blank for forming the box. This straight, consistent body score is necessary for boxes that are produced from plastic corrugated material to perform similar to paper corrugated material in automated packaging line equipment.

In accordance with one aspect of the invention, a plastic corrugated box having straight body scores is provided. The box comprises a sheet of plastic corrugated material having a first outer layer, a second outer layer and a plurality of flutes extending between the first outer layer and the second outer layer. The sheet has a plurality of panels defining side walls of the box and a plurality of fold lines between adjacent panels of the plurality of panels. The sheet also includes a first plurality of welded portions proximate a top edge of the plurality of panels and a second plurality of welded portions proximate a bottom edge of the plurality of panels. Each of the plurality of fold lines includes a first portion in one of the first plurality of welded portions and a second portion in one of the second plurality of welded portions.

Each of the plurality of fold lines can also include a third portion extending between the first portion and the second portion. The third portion can be wider than the first portion. That is, each first portion of the plurality of fold lines can have a first width and each third portion of the plurality of fold lines has a second width that is greater than the first width (e.g., double). Similarly, each second portion of the plurality of fold lines can have a width the same as the first width.

The box can further comprise a plurality of bottom flaps. Each of the plurality of bottom flaps extends from the bottom edge of one of the plurality of panels defining side walls and is separated from the panel by a score line. Similarly, the box can comprise a plurality of top flaps. Each of the plurality of top flaps extends from the top edge of one of the plurality of panels defining side walls and is separated from the panel by a score line.

In some instances, each of the second plurality of welded portions extends onto an edge portion of adjacent bottom flaps. Similarly, each of the first plurality of welded portions can extend onto an edge portion of adjacent top flaps.

In accordance with another aspect of the invention a plastic corrugated box comprises a first side wall panel formed from a corrugated plastic having a first outer layer, a second outer layer and a plurality of fluted between the first outer layer and the second outer layer and a second side wall panel formed from a corrugated plastic having a first outer layer, a second outer layer and a plurality of fluted between the first outer layer and the second outer layer positioned next to the first side wall panel. The box includes a first welded portion proximate a first edge of a portion of the first side wall panel and a first edge of a portion of the second side wall panel. The box also includes a first fold line between the first side wall panel and the second side wall panel having a first portion positioned in the first welded portion and a second portion extending from the first welding portion.

Similarly, the box can include a second welded portion proximate a second edge of a portion of the first side wall panel opposed from the first edge of the first side wall panel and a second edge of a portion of the second side wall panel opposed from the first edge of the second side wall panel. The first fold line can include a third portion positioned in the second welded portion. The first portion of the fold line can have a first width and the second portion of the fold line has a second width greater than the first width.

The box can include a third side wall panel positioned next to the second side wall panel, a third welded portion proximate the first edge of the second side wall panel and a first edge of the third side wall panel, and a second fold line having a first portion positioned in the third welded portion and a second portion extending from the first portion. Additionally, the box can include a fourth welded portion proximate the second edge of the second side wall panel and a second edge of the third side wall panel wherein the fold line includes a third portion positioned in the fourth welded portion. The third portion of the second fold line can have the first width.

The box can further include a first bottom flap extending from the second edge of the first side wall panel and a second bottom flap extending from the second edge of the second side wall panel. Similarly, the box can include a first top flap extending from the first edge of the first side wall panel and a second top flap extending from the first edge of the second side wall panel.

In accordance with yet another aspect of the invention, a process for forming a straight body score in a box or container is provided. The straight body score forms fold lines defining edges of side wall panels of the box. The process comprises providing a rectangular sheet of corrugated plastic material having a first outer lay, a second outer layer and a plurality of flutes extending between the first outer layer and the second outer layer. The process includes forming a first welded portion proximate a first (or top) edge of a side wall (at a position between where a first side wall panel will abut a second adjacent side wall panel), and a second welded portion proximate an opposing second (or bottom) edge of the side wall (as used herein, directional terms—e.g., top, bottom—will be used to reflect the positioning of features in the figures, or in a box in a normally configured upright position, and not to limit the box to a particular position or orientation). The process further includes utilizing a rule score to form a first score in the first welded portion, a second score in the second welded portion and a third or middle score in the panel between the first welded portion and second welded portion.

The middle score can be twice the width of the first score and the second score. However, other variations of width can be used.

In addition to having the first and second welded portions proximate the edges top and bottom edges of the side wall panels, one or more additional welded portions can be formed in middle of the panels between the first and second welded portions. In this instance, additional scores can be formed in the additional welded portions. In one extreme aspect, the entire area between the first and second welded portions can be welded (in this instance, the welded portions can collectively be considered or formed as a single welded portion), and the score can be formed through all or parts of the welded portion.

The process can include forming a welded portion in flaps extending from the edges of the side wall proximate the first or second welded portions, and forming a slot in this extended welded portion.

A special scoring rule can be used to create the plastic corrugated boxes. The scoring rule can include an upper segment configured to score an upper welded portion of the box, a lower segment configured to score a lower welded portion of the box, and a middle segment to score a middle portion of the box between the upper and lower welded portions. The middle segment preferably has a width greater than the width of the upper and lower segments (e.g., twice as thick) to make sure that it compresses a rib in this area. For boxes that do not include top flaps (and therefore do not need upper welded portions), the scoring rule could be formed to include the lower segment and the middle segment only (obviously, the "middle" segment would be considered an "upper" or "top" segment in this instance).

Additionally aspects of the invention are described herein and are shown in the Figures.

BRIEF DESCRIPTION OF THE DRAWINGS

To understand the present invention, it will now be described by way of example, with reference to the accompanying drawings in which:

FIG. 28 is a perspective view of sealing dies forming a smooth sealed edge on a corrugated plastic blank;

FIG. 29 is front plan view of one of the sealing dies of FIG. 28;

FIG. 32 is a perspective view of a stack of corrugated plastic blanks having a manufacturer's joint that had not been flattened or had reverted back to original thickness on top of a stack of corrugated paper blanks;

FIG. 39a is a top plan view showing a corner of a paper corrugated box formed by a scoring die in a conventional manner;

FIG. 39b is a top perspective view of a corner a plastic corrugated box formed by a scoring die in a conventional manner;

FIG. 40 is a perspective view of a box formed from a blank of material;

DETAILED DESCRIPTION

Figure 1:
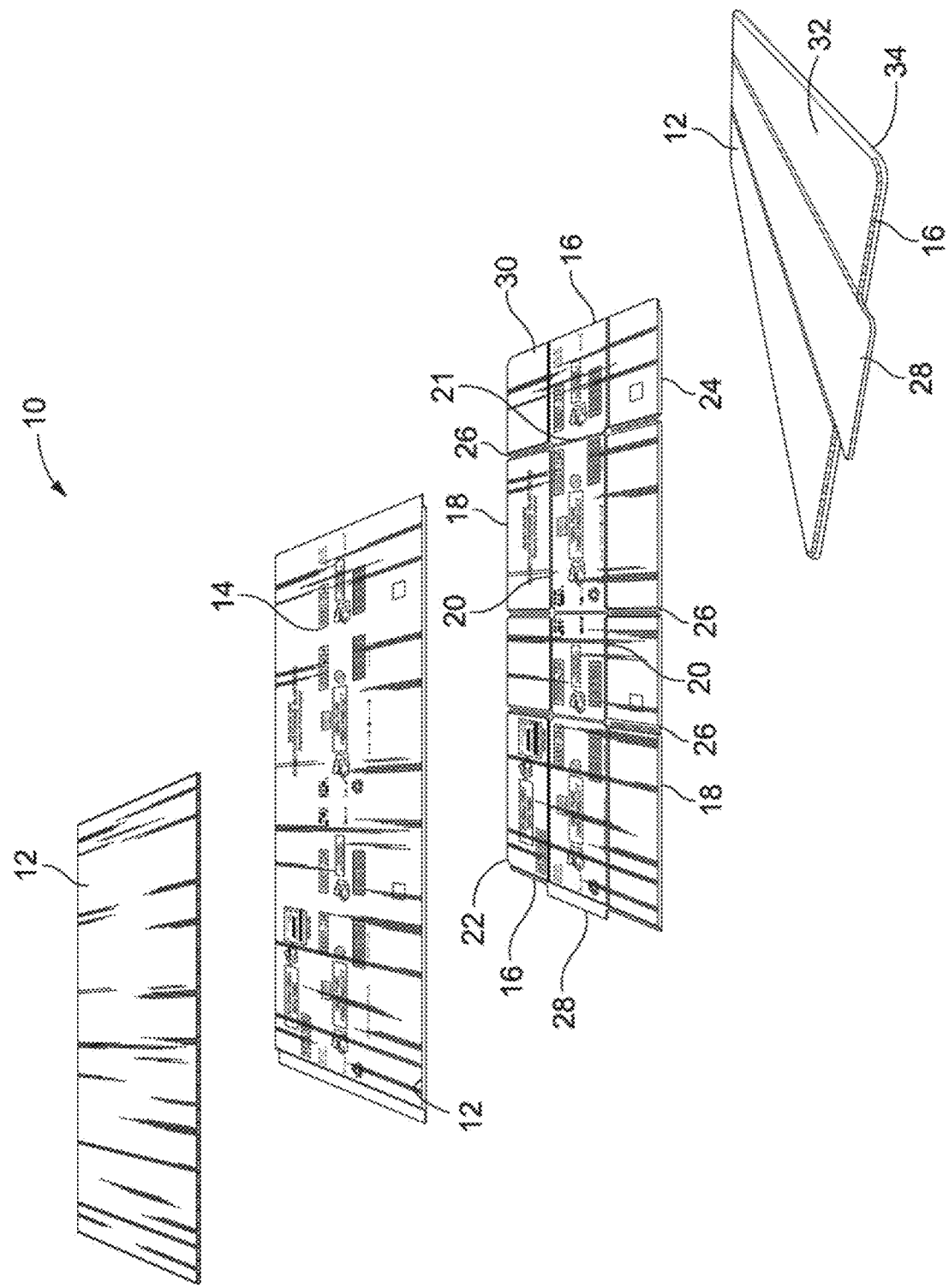
FIG. 1 is a schematic view of the prior art manufacturing process for a plastic corrugated box.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 illustrates a plurality 10 of progressively formed blanks 12 in a known method of forming plastic corrugated material into boxes using conventional converting equipment. The method includes the steps of obtaining a sized plastic corrugated blank 12, printing 14 thereon, if necessary, on one or both sides of the plastic corrugated blank 12, sealing the vertical edges 16 and the horizontal edges 18, forming scores (sometimes also referred to as score lines) 20 therein and creating side wall panel fold lines 21 therein, and die cutting slots 26 for the major flaps 22 and minor flaps 24 (which form the top and bottom of the box) and a glue tab 28 at one end of the blank 12. The steps of sealing the edges 16, 18 and forming the scores 20 in the plastic corrugated blank 12 are preferably performed at the same time the blank 12 is die cut. Specifically, the edge seals 16, 18 are formed during the die cutting process using heat and pressure to weld together a first outer surface 32 and a second outer surface 34 of the plastic corrugated blank 12. The scores 20 are also formed by applying heat and pressure during the die cutting. The step of die cutting and forming the scores 20 cuts the plastic corrugated blank 12 into the desired shape, forming the major and minor flaps 22, 24, and the glue tab 28.

The known die cutting involved in this process can include the use of clam shell or flatbed machines. When using a clam shell die cutting machine in current methods, the back of a die board is heated which transfers heat to a heating rule. The heated die board cuts and seals the plastic corrugated material 12 against a steel plate at ambient temperature. When using a flatbed die cutting machine, the known method includes heating a steel cutting surface to transfer heat through the plastic corrugated material as it moves through the die cutting process. A die board at ambient temperature presses and cuts the plastic corrugated material 12 against the heated cutting surface to form a heated edge seal.

The step of printing is optional. If printing onto a surface 32, 34 of the plastic corrugated blank 12 is desired, it is conventionally performed using flexographic, silk screen, digital or other suitable methods.

The method also includes the steps of assembling a manufacturer's joint (i.e., connecting the glue tab 28 to the other end of the blank 12), and converting the glued blanks 12 to make finished boxes. In this instance, the boxes would have four side wall panels. The major and minor flaps would be folded to form a top and bottom to the box.

Figure 22:
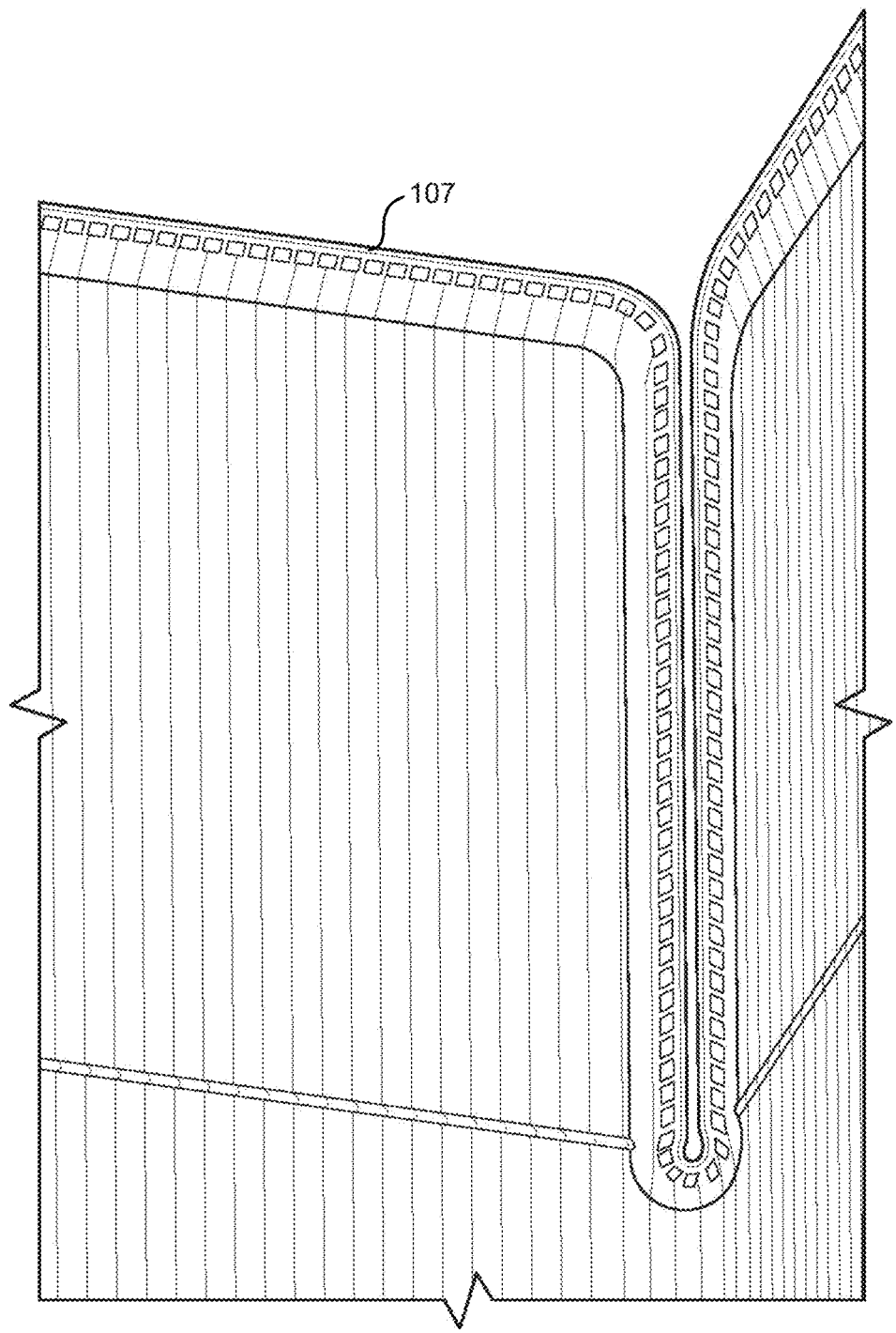
FIG. 22 is a perspective view of a corner of a plastic corrugated container with the edges of the flaps having a sharp die cut seal.

Problems with the known method include variations in quality and robustness of the seal(s) around the edges of the box. In this regard, the heated platen on the die cutter forms a sharp edge on the blank and particularly along the outer edges of the flaps 22, 24, resulting in potential lacerations to people involved in the process, and in using the blanks (an enlarged view of the sharp edges 107 after sealing during die cutting is shown in FIG. 22). Moreover, the die cut and scored blanks cannot be re-used currently with conventional converting equipment because (in part) the flaps formed in the known method do not return to a straight orientation generally coplanar with the side wall panels of the box after a first use. The known method also results in relatively slow die cut speeds. Additionally, the known method also produces boxes with a relatively thick manufacturer's joint. As illustrated in FIG. 32, the relatively thick manufacturer's joint formed in the known method causes a recognizable bowing in the center of a stack 240 of the glued plastic corrugated blanks.

The present invention provides a re-useable plastic corrugated box and a process for forming plastic corrugated boxes that can be easily cleaned and reused in conventional converting machinery typically used with paperboard corrugated boxes. The process includes pre-sealing (i.e., pre-crushing and/or welding or ironing of the corrugated plastic to remove memory) certain areas of a blank (i.e., a rectangular sheet of corrugated plastic) to be die cut (such as the flap slot areas and the manufacturer's joint), ultrasonically forming score lines, and forming smooth, sealed edges across the flutes of the outer flaps (the smoothed edges can be rounded, flat or other configurations). The pre-sealed, ultrasonically scored and smooth, sealed edged sheet can then be placed in conventional converting systems for forming into boxes, and can be cleaned and reused in the converting systems. The process described herein takes into consideration both the movement or flow of plastic and air during the pre-sealing steps.

Figure 2:
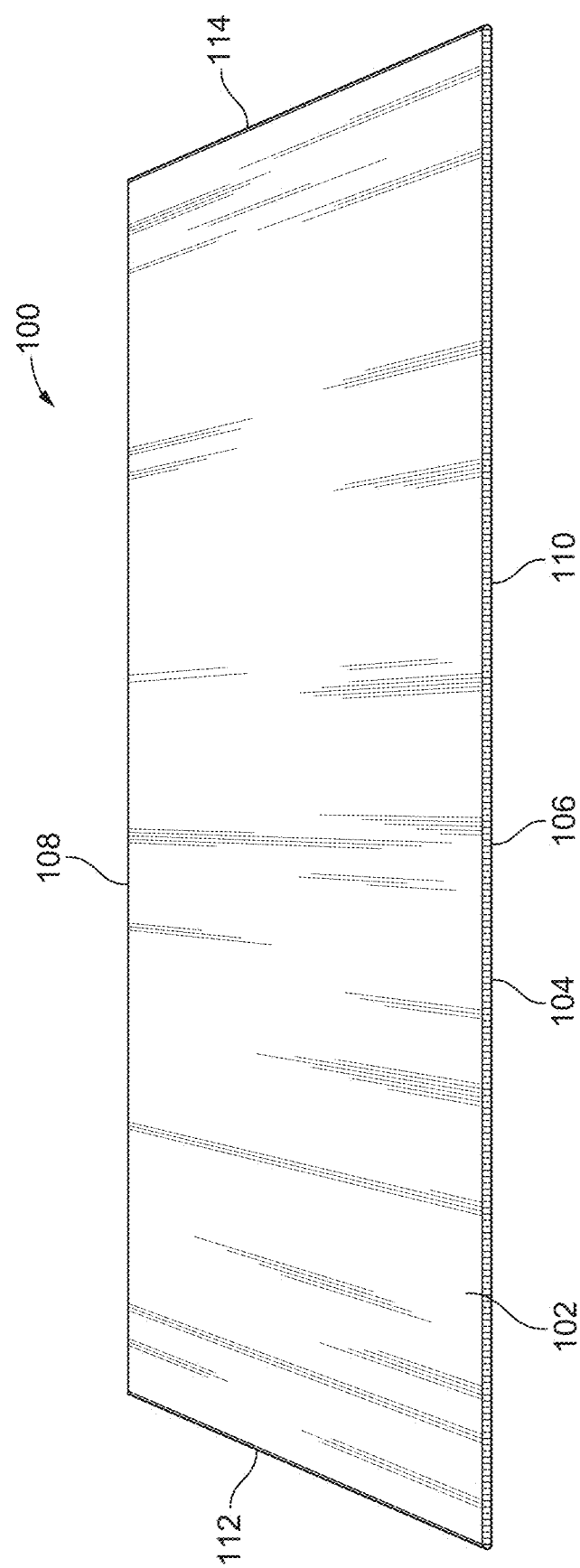
FIG. 2 is a perspective view of an extruded plastic corrugated blank for a plastic corrugated box in accordance with the present invention.

In accord with an embodiment of the present invention, a plastic corrugated rectangular blank 100 (FIG. 2) is initially formed using current plastic corrugated extrusion methods. FIG. 2 shows the blank 100 cut to its initial desired size. The size and shape of the blank (and the container or box formed from the blank) will depend on the desired application for which the finished box will be used. Plastic corrugated boxes can be used to store and transport any number of products from food items to automotive parts and can be made in many sizes and shapes. While the present invention is described in terms of a rectangular box having four side panels connected to top and bottom major and minor flaps, containers and boxes of various sizes and shapes (e.g., square, octagonal, etc.), can be made using the techniques and aspects of the invention(s) described herein.

When extruded, the blank 100 includes a first outer surface (or skin) 102 and a second outer surface 104. Between the first and second outer surfaces 102, 104 are a plurality of generally parallel flutes 106. Flutes formed in a profile board style corrugated plastic sheet are created by ribs between the two outer sheets 102, 104 (as opposed to undulating waves of material commonly found in paper corrugation and other types of corrugated plastic). As illustrated in FIG. 2, the blank 100 includes top and bottom edges 108 and 110 and first and second side edges 112 and 114. Terms such as "top," "bottom," "side" etc., are made with respect to the orientation of the blank, box or other components as shown and positioned in the Figures to facilitate the description thereof. Such terms are not intended to limit the invention in any manner and may change from Figure to Figure. For example, the "top" edge 108 shown in one Figure may end up being the edge of the "bottom" flaps as shown in another Figure. The top and bottom edges 108 and 110 run across the flutes 106 and will form the outer edges of any flaps formed in the blank 112 (or the top edge of the side panels of a half slotted container—HSC).

Figure 3:
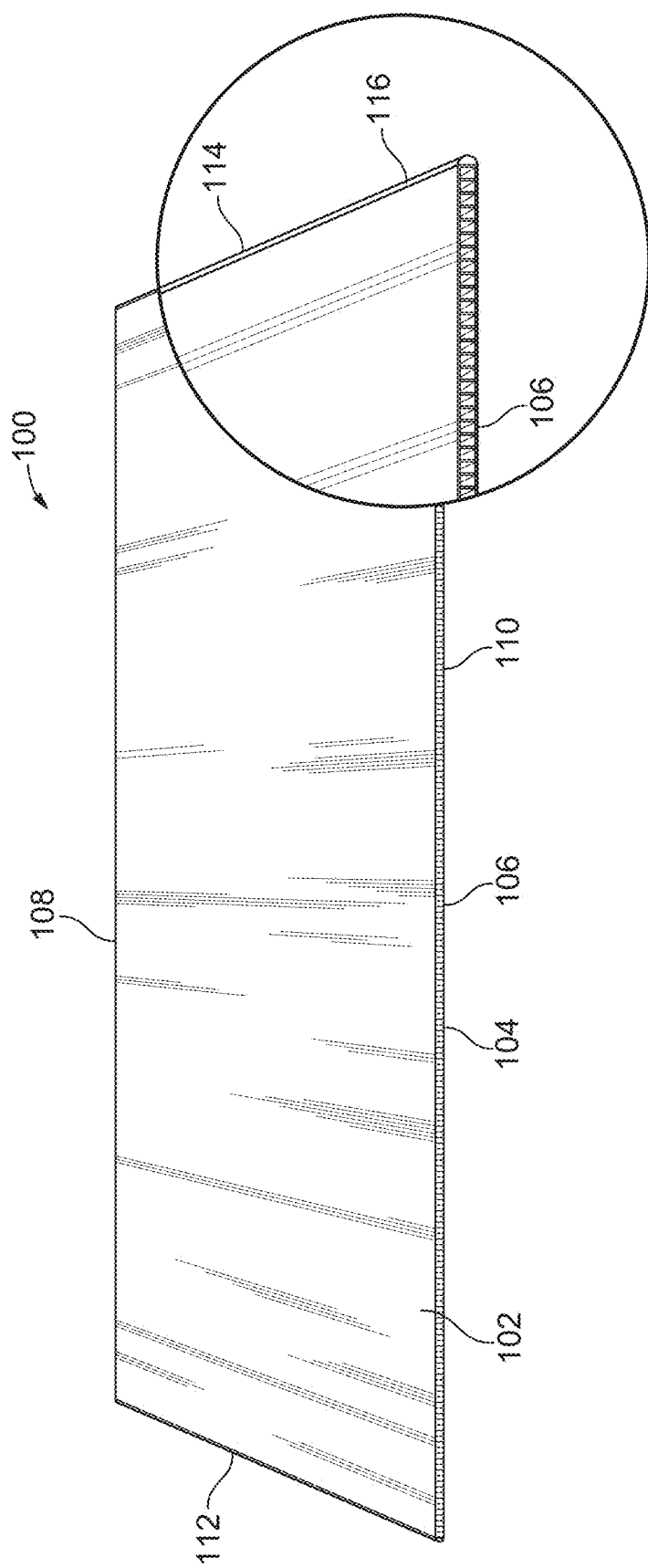
FIG. 3 is a perspective view of a plastic corrugated blank with its vertical edges sealed in accordance with the present invention.
Figure 15:
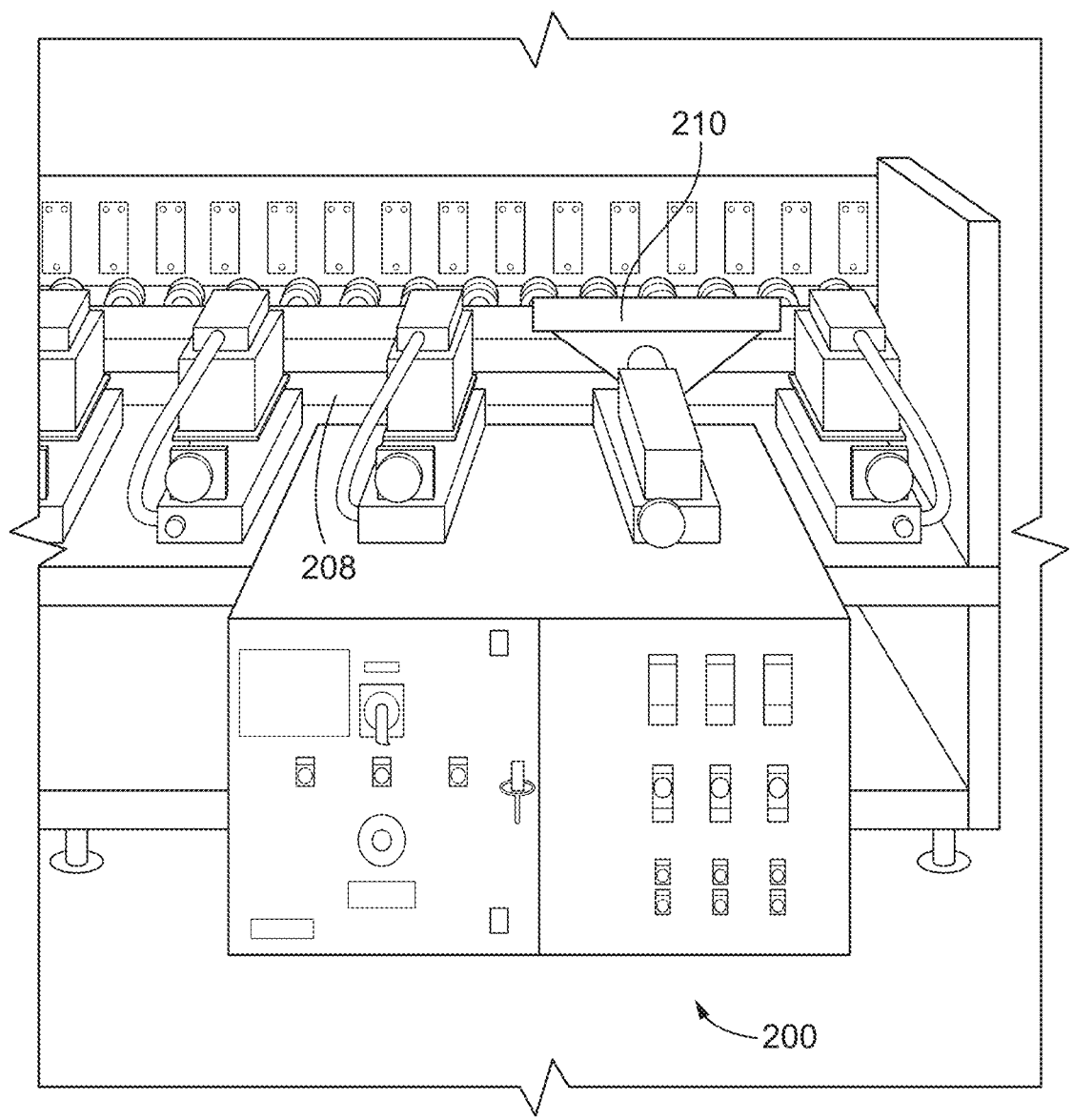
FIG. 15 is a perspective view of an apparatus for sealing the edges of the plastic corrugated blank in accordance with the present invention.
Figure 16:
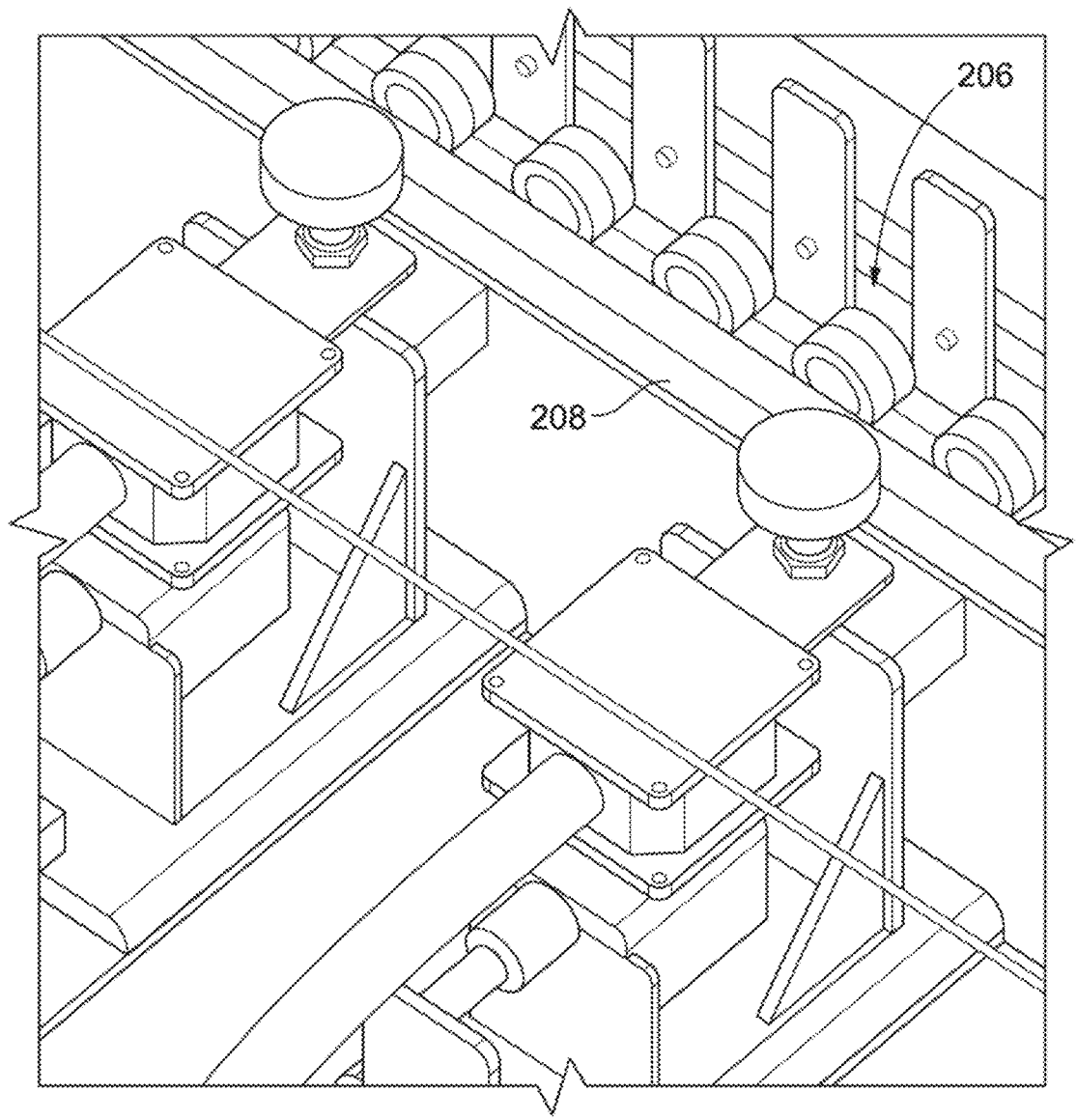
FIG. 16 is a perspective view of an apparatus for sealing the edges of the plastic corrugated blank in accordance with the present invention.

In one embodiment, the blank 100 is sealed along the first and second side edges 112 and 114 in the direction of the flutes 106, creating a first side edge seal 118 and a second side edge seal 116 (as described below, this can instead be preferably accomplished when pre-sealing an entire strip on either end of the blank 100 to form a manufacturer's joint and pre-sealing areas for slots between top and bottom flaps). FIG. 3 shows the second side edge seal 116 in an enlarged portion along the second side edge 114. It will be understood that the similar first side edge seal 118 will be created at the first side edge 112. The blank 100 is placed on a conveyor 206 (See FIGS. 15 and 16), where a hot air blower 207 (or multiple blowers) heats the first and second side edges 112 and 114 of the blank 100. A knife cuts through the flutes 106 on the edge to be sealed. The blank 100 is moved through multiple heated dies 208 to form a smooth edge. The blank 100 is then moved through an identically shaped cooling die 210. The heating and cooling dies 208 and 210 have generally C-shaped cross-sections 204. The sealing of both side edges 112, 114 can also be performed in a single pass. It is recognized that the die or dies can be progressive, meaning instead of a single die, there are multiple dies having a progressively different shape leading up to a final die with the final desired shape formed therein.

The heated dies 208 include a heated sealing and forming die 202 with a generally C-shaped section 204. The heated sealing and forming die 202 contacts the edges 112 and 114, and partially melts or reforms the edge to seal it and create a smooth rounded edge surface.

Figure 12:
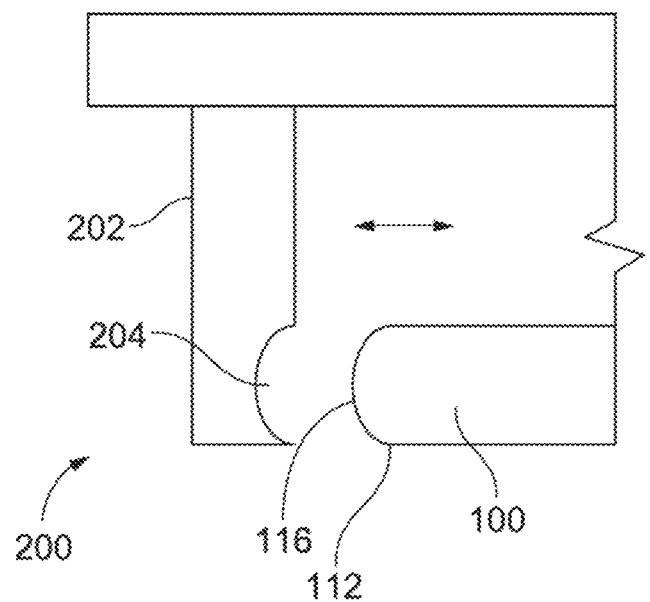
FIG. 12 is a schematic view of an apparatus for sealing the edges of the plastic corrugated blank in accordance with the present invention.

The top and bottom edges 108, 110 are then sealed as illustrated in FIG. 28. FIG. 28 shows a first sealing die 220 contacting the bottom edge 110 and a second sealing die 222 contacting the top edge 108 as the blank 100 is moved past the dies 220, 222. As shown in FIG. 29, the dies 220, 222 have an open slot 224 for receiving the edge portion of the blank 100. A heated element, such as that shown in cross-section in FIG. 12 contacts the edges of the blank 100 to form a smooth sealed edge as the blank 100 moves past the dies 220, 222 (in the direction of the arrow 226). The open slot 224 of each die 220, 222 can further include a flared portion 228 for receiving the leading portion of the blank 100 as it approaches the dies 220, 222.

As evident in FIG. 28, prior to entering the dies 220, 222, the edge of the blank 100 has open sides and exposed flutes 106. After passing through the dies 220, 222, a smooth sealed edge (e.g., 122) is formed and the interior of the blank as well as the flutes are not exposed.

Figure 4:
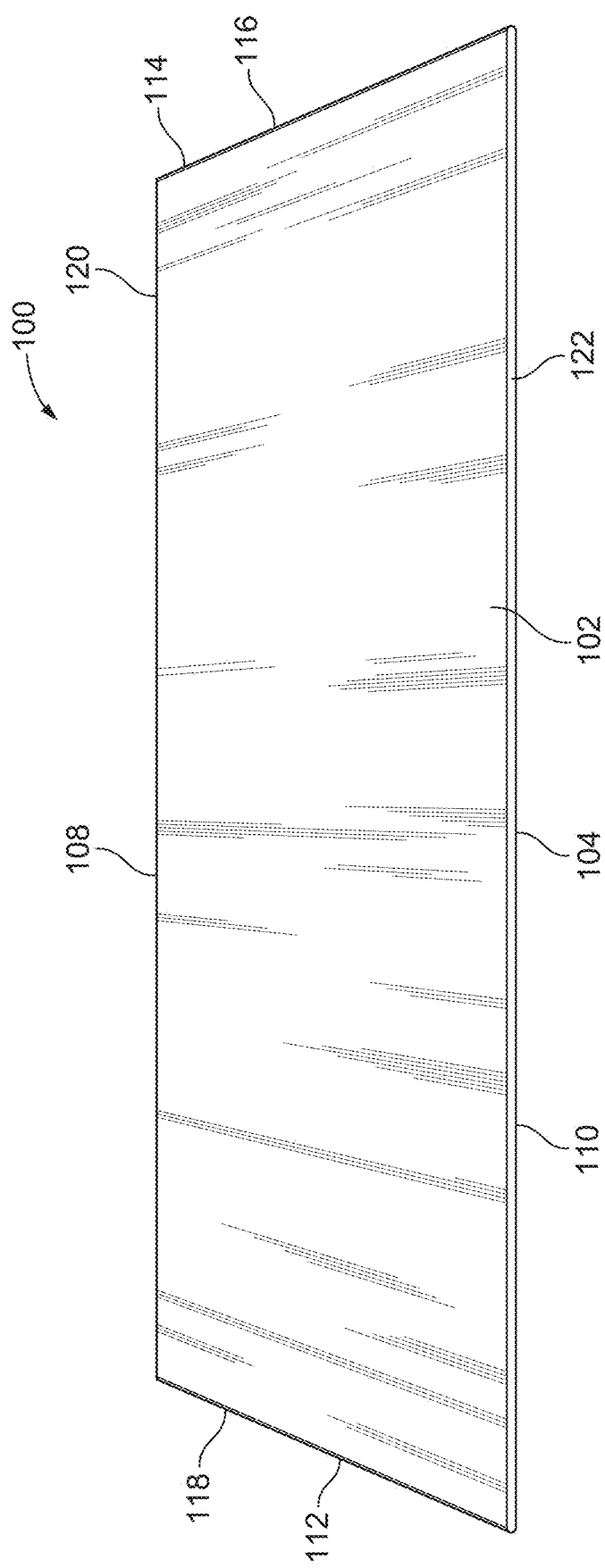
FIG. 4 is a perspective view of plastic corrugated blank sealed across its flutes in accordance with the present invention.
Figure 20:
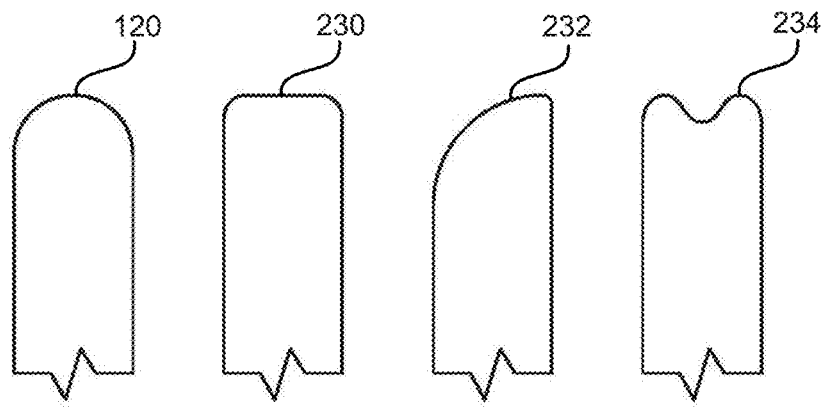
FIG. 20 is side plan view showing a variety of smooth sealed edge configurations.

FIG. 4 shows the top and bottom edges 108 and 110 sealed using the dies 220, 222 creating top and bottom smooth edge seals 120 and 122, respectively. Top and bottom edge seals 120 and 122 are sealed across the flutes 106, thereby closing the openings into the flutes which will prevent debris, liquids or other contaminants from becoming trapped in the interior of the sheet between the flutes 106. Moreover, this smooth sealing provides safe, smooth rounded seals 120 and 122 on the edges of the blank 100 most frequently contacted by human hands, namely the top edge 108 and bottom edges 110. It will be understood that this sealing process can be performed at any desired point in the process of the present invention. Additionally, the sealed edges can be flat or other shapes so long as they are relatively smooth. FIG. 20 shows (in cross-section) a rounded smooth sealed edge 120 and a number of possible variations 230, 232, 234 of smooth sealed edges.

Figure 5:
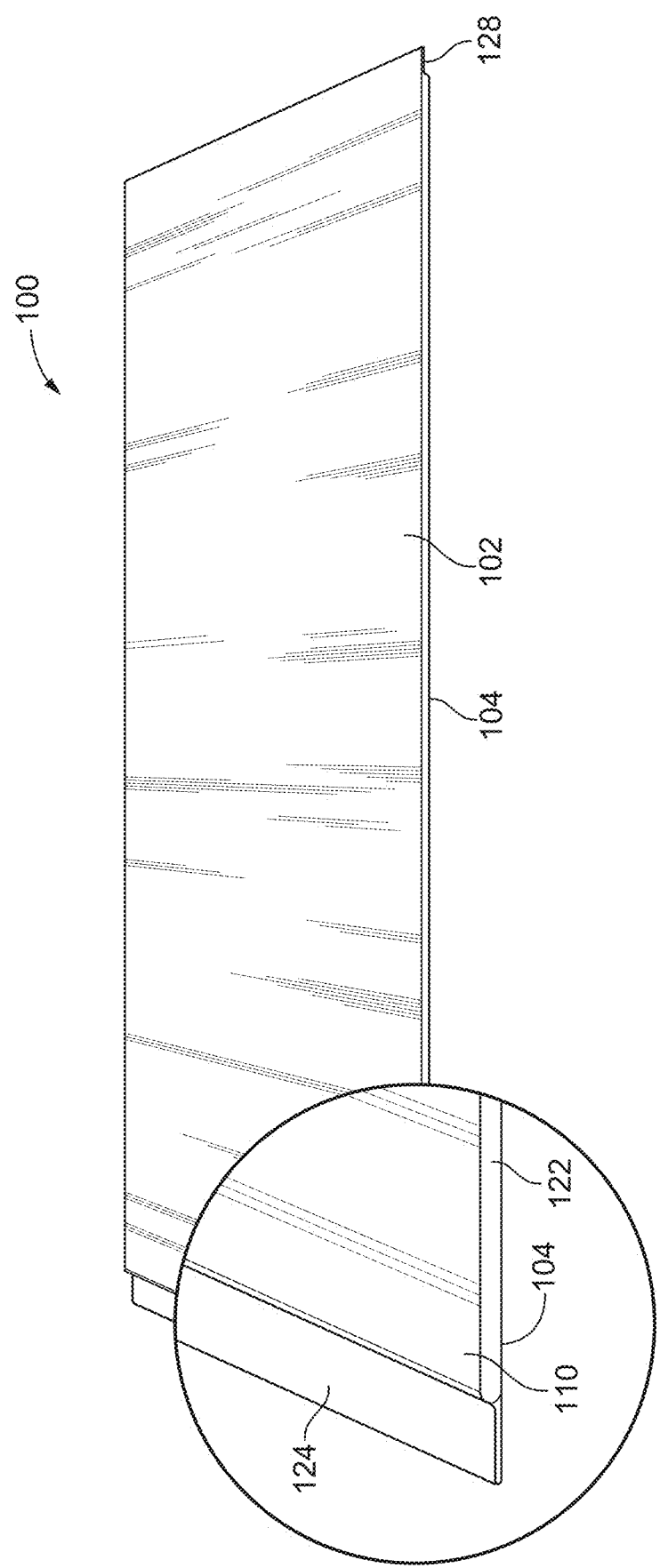
FIG. 5 is a perspective view of a plastic corrugated blank with pre-sealed glue tab and fourth panel areas in accordance with the present invention.
Figure 6:
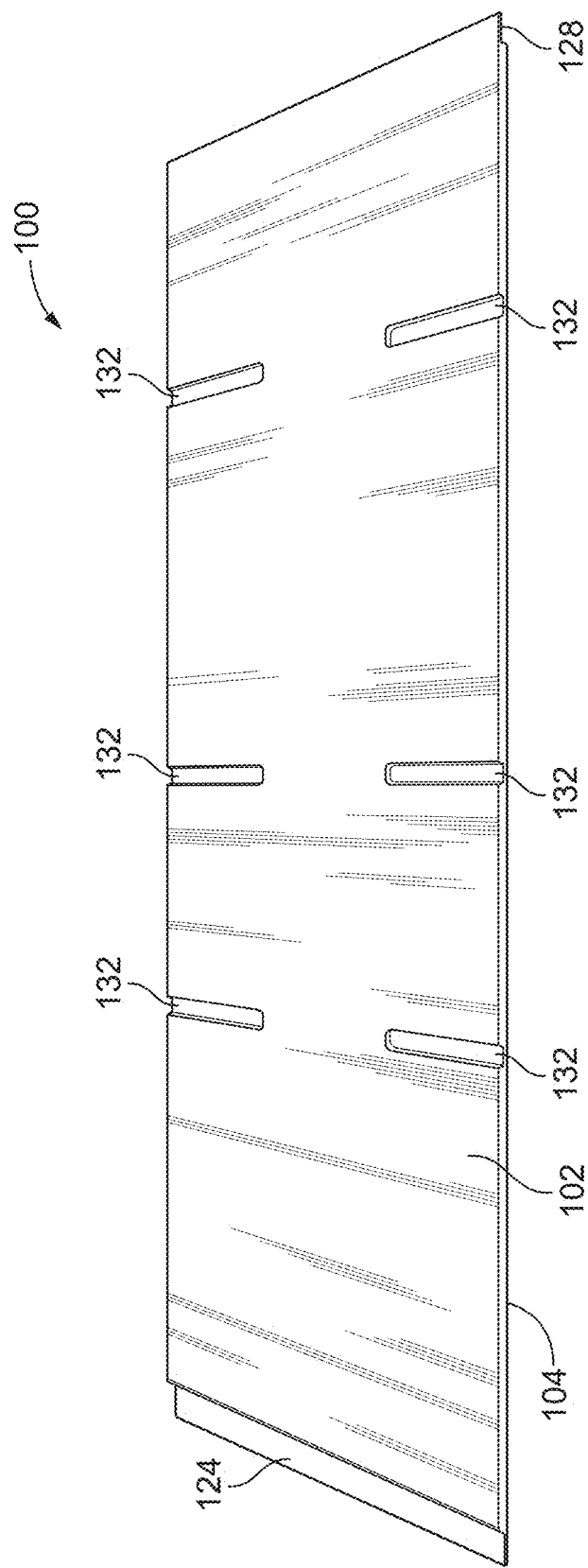
FIG. 6 is a perspective view of a plastic corrugated blank with pre-sealed major and minor flap areas in accordance with the present invention.
Figure 9:
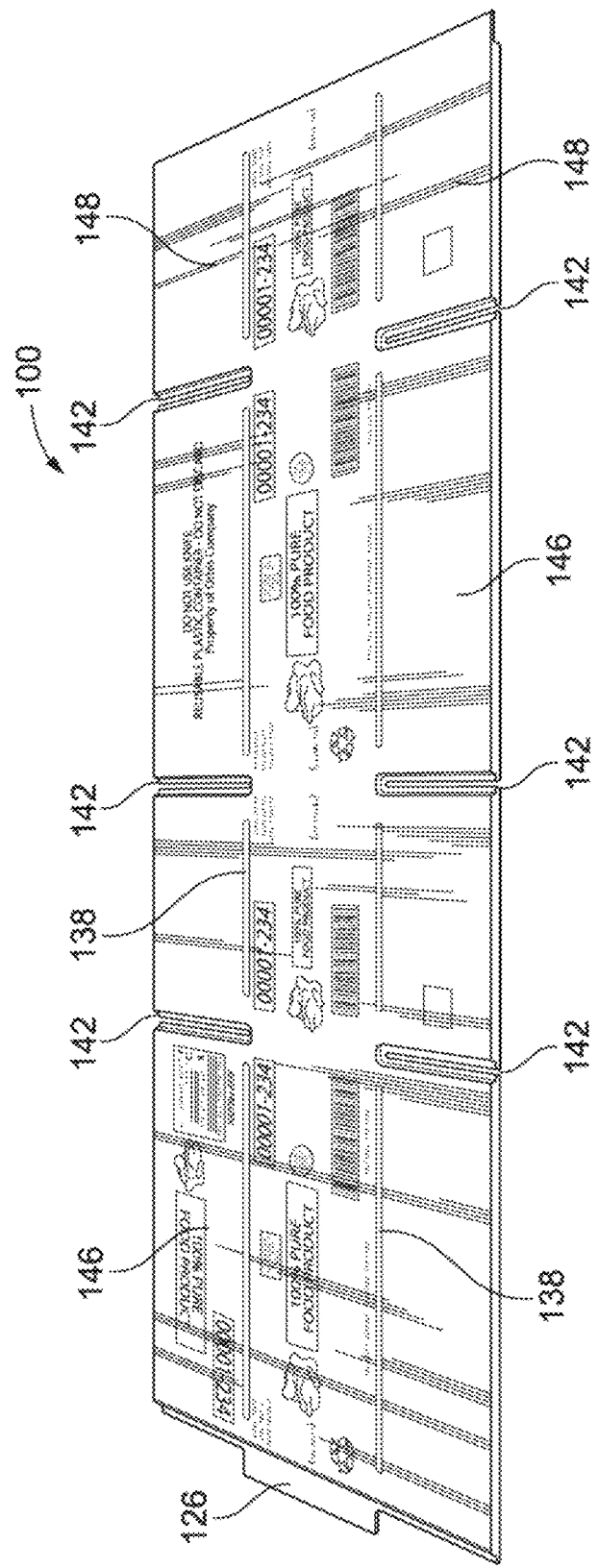
FIG. 9 is a perspective view of a plastic corrugated blank after the major and minor flap areas and glue tab area and fourth panel area have been die cut.
Figure 10:
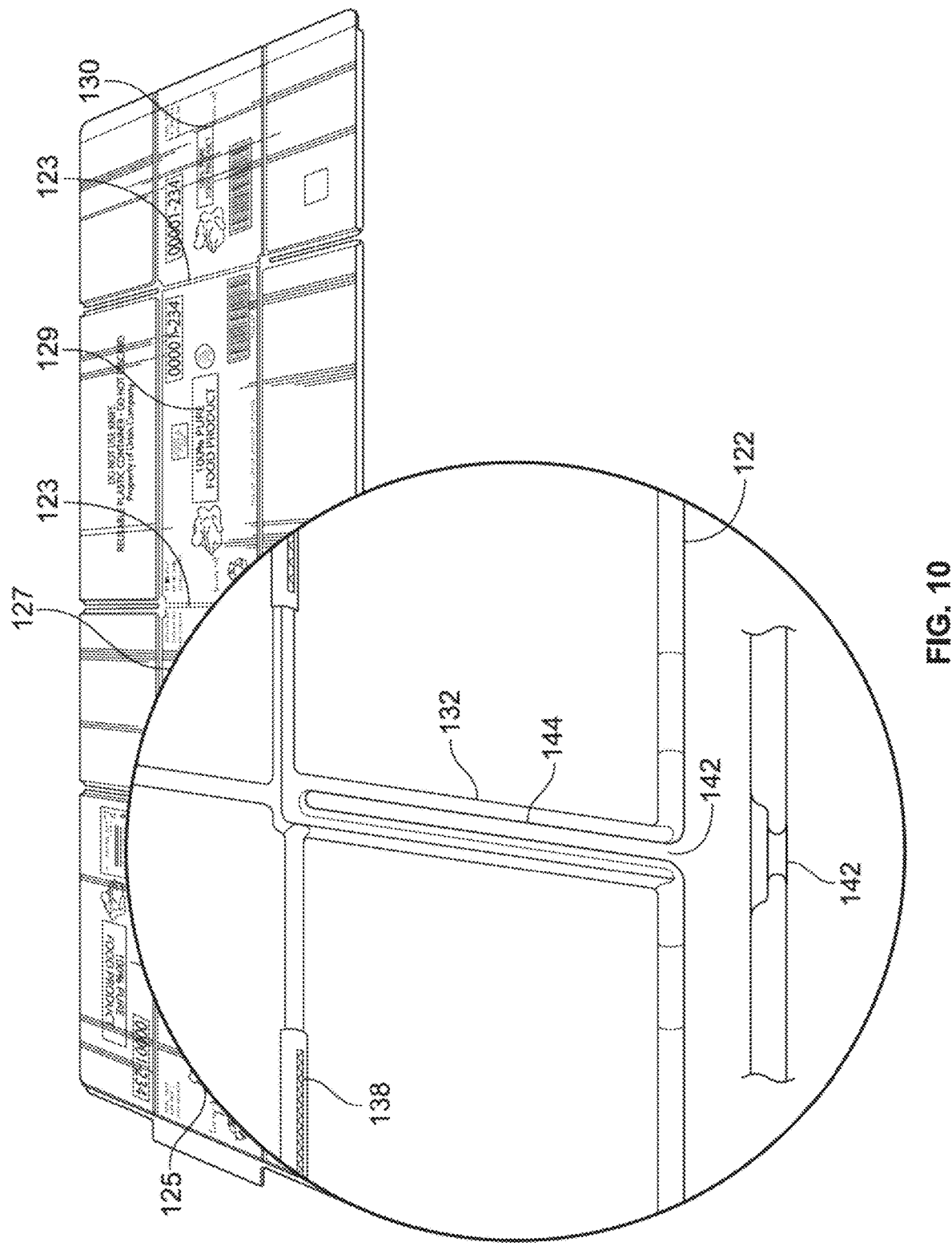
FIG. 10 is an enlarged view of the die cut flap area of FIG. 9.

As illustrated in FIG. 5, after sealing of the top and bottom edges 108, 110 (i.e., across the open or exposed flutes 106), the blank 100 is pre-sealed proximate the first and second side edges 112 and 114 in the desired area 124 for a glue tab 126 (the glue tab 126 is shown in FIG. 9) and a desired connection area 128 of a fourth side panel 130 (i.e. the glue tab 126 is considered to extend from the first side wall panel 125 of the completed box and is connected to the other end of the box designated as the fourth side wall panel 130—see e.g., FIG. 10). As mentioned above, this pre-sealing step can also seal the side edges 112, 114 of the blank 100 and thus the separate side edge sealing step discussed above may be eliminated. Moreover, the side edge pre-sealing can be done at the same time as pre-sealing the slot areas 132 (i.e., the areas between the flaps) as shown in FIG. 6 and discussed below. The pre-sealing can be accomplished using any suitable means, including heat and compression, plunge ultrasonic welding, or rotary ultrasonic welding.

Figure 33A:
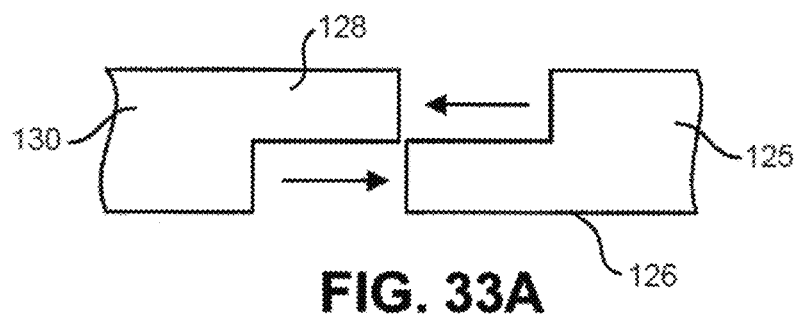
FIG. 33A is side plan view illustrating a pre-sealed glue tab and a pre-sealed edge area of a fourth panel prior to being connected.
Figure 33B:
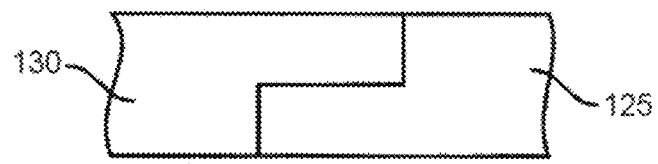
FIG. 33B is side plan view illustrating a pre-sealed glue tab and a pre-sealed edge area of a fourth panel after being connected.
Figure 34:
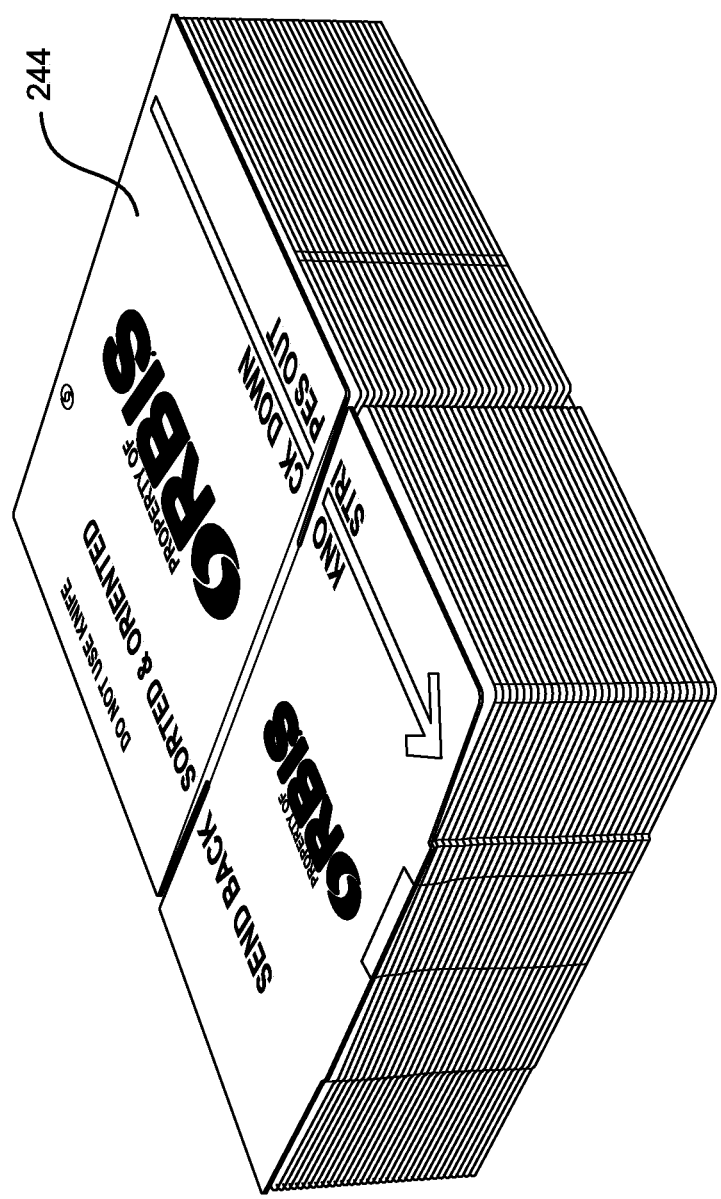
FIG. 34 is a perspective view of a stack of corrugated plastic blanks with a manufacturer's joint that does not add thickness to the blank.

In a subsequent step shown in FIG. 9, the pre-sealed edge 124 is cut leaving a centrally located glue tab 126. The glue tab 126 is connected (e.g., glued, although ultrasonic welding or other means may be used) to the pre-sealed area 128 of the fourth side wall panel 130 to create a plastic corrugated box. The glue tab 126 and area of the fourth side wall panel 128 the glue tab 126 is ultimately connected to is referred to as the "manufacturer's joint." An object of the invention is to create a manufacturer's joint that will not cause a stack of unformed boxes to unreasonably bow out in that area. For example, FIG. 32 which shows a stack 240 of corrugated plastic blanks formed using prior known converting processes on top of a stack 242 of paper blanks. As evident in this Figure, the stack 240 of corrugated plastic blanks has a thicker middle section due to the manufacturer's joint. Instead, it is desirable to reduce any bowing and have a relatively flat stack 244 of unformed boxes as shown in FIG. 34. Accordingly, it is desirable that at least one (and preferably both) of the glue tab 126 and the fourth panel area 128 be flattened during pre-sealing to a thickness less than the blank thickness (i.e., if one or both are pre-sealed to less than the blank thickness, the total thickness in that area will be less than two blank thicknesses). Moreover, it is preferable that the manufacturer's joint will have no added thickness beyond the thickness of the blank. That is, it is preferred that the glue tab 126 and fourth panel area 128 are pre-sealed so that the combined total thickness of the glue tab 124 and fourth panel area 128 is preferably equal to or less than a single blank thickness as shown in FIGS. 33A and B.

Figure 13:
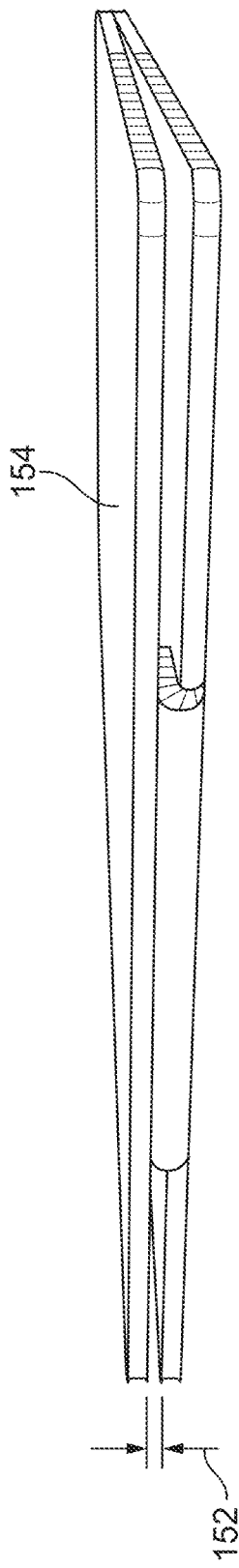
FIG. 13 is a perspective view of a manufacturer's joint of a current blank.
Figure 14:
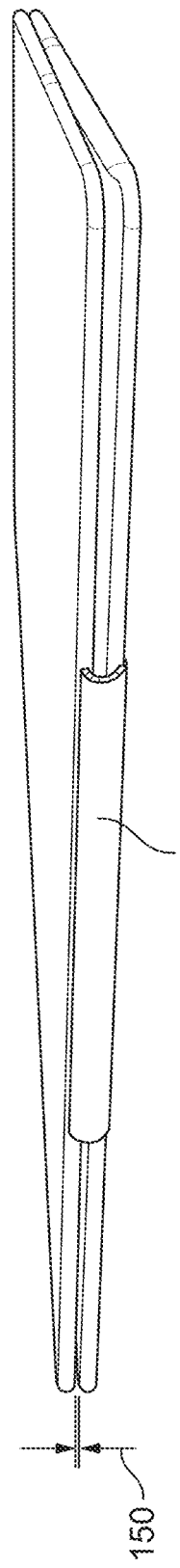
FIG. 14 is a perspective view of a manufacturer's joint in accordance with the present invention.

As illustrated in FIG. 14, a pre-sealed, pre-sealed glue tab 126 is connected to a pre-sealed, pre-sealed area 128 of the fourth side wall panel 130. This results in a manufacturer's joint having zero increased thickness 150. In comparison, a box 154 formed using current methods has an increased thickness 152 (an additional blank thickness) at the manufacturer's joint as shown in FIG. 13.

The blank 100 is also pre-sealed in the desired areas to form flattened and sealed segments 132 from which major and minor flap slots 142 of a resulting finished box 136 will be die cut (see FIGS. 6-10). The pre-sealing flattens the blank 100 in the desired slot areas, effectively welding the inner and outer surfaces 102, 104 and flutes 106 to each other. The pre-sealing can be created by any suitable means, including plunger ultrasonic welding, rotary ultrasonic welding or by using heat and compression rollers, with a preferred method being rotary ultrasonic welding.

Figure 7:
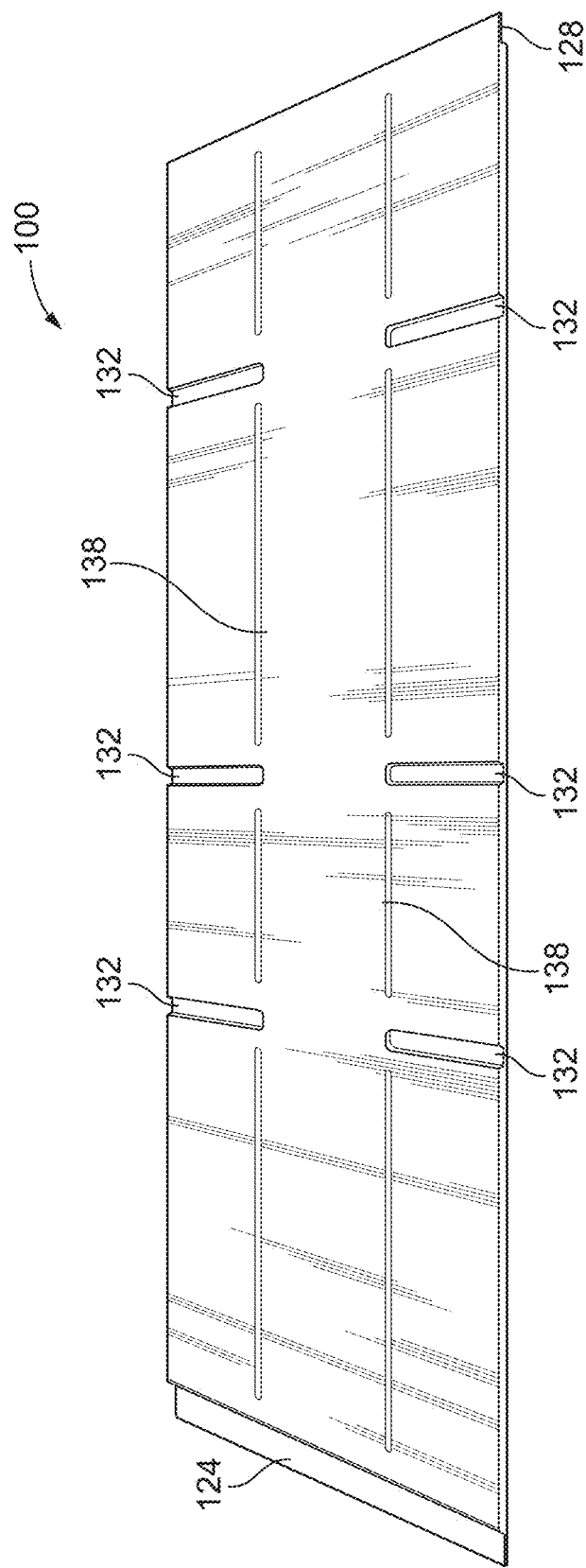
FIG. 7 is a perspective view of a plastic corrugated blank with major and minor flap scores in accordance with the present invention.

As shown in FIG. 7, score lines 138 are formed in the blank 100. The score lines 138 will form the major and minor flaps 146, 148 of the finished box 136. The scoring operation can be performed in accord with that disclosed in co-pending U.S. Ser. No. 13/273,019, filed Oct. 13, 2011, now U.S. Pat. No. 8,864,017, the contents of which are incorporated herein by reference. Briefly, the scoring from such application provides an intermittent welded score, leaving some portions of the score lines unwelded (i.e., not welded). Scoring using this method allows the major and minor flaps to be easily closed yet retain enough "memory" or "spring-back" such that after folding the flaps at the score, the flaps will return to its original shape and can be reused (after cleaning) in box converting machinery. It will be understood that the pre-sealing and the scoring can be performed such that the scoring takes place before the pre-sealing.

In another embodiment, the score lines 138 are formed using ultrasonic devices, such as with a rotary ultrasonic device, to reshape the corrugated plastic along the score line. The score lines using rotary ultrasonic reshaping can be a continuous line, or can be segmented, with sections of the score line left unchanged. Using rotary ultrasonic reshaping to form the score lines 138 allows easy folding of the major and minor flaps 146, 148 while having enough memory to return the flaps to a straight position after use (i.e., having the flaps align with the sides of the box as shown in the stack 244 of FIG. 34).

Figure 17A:
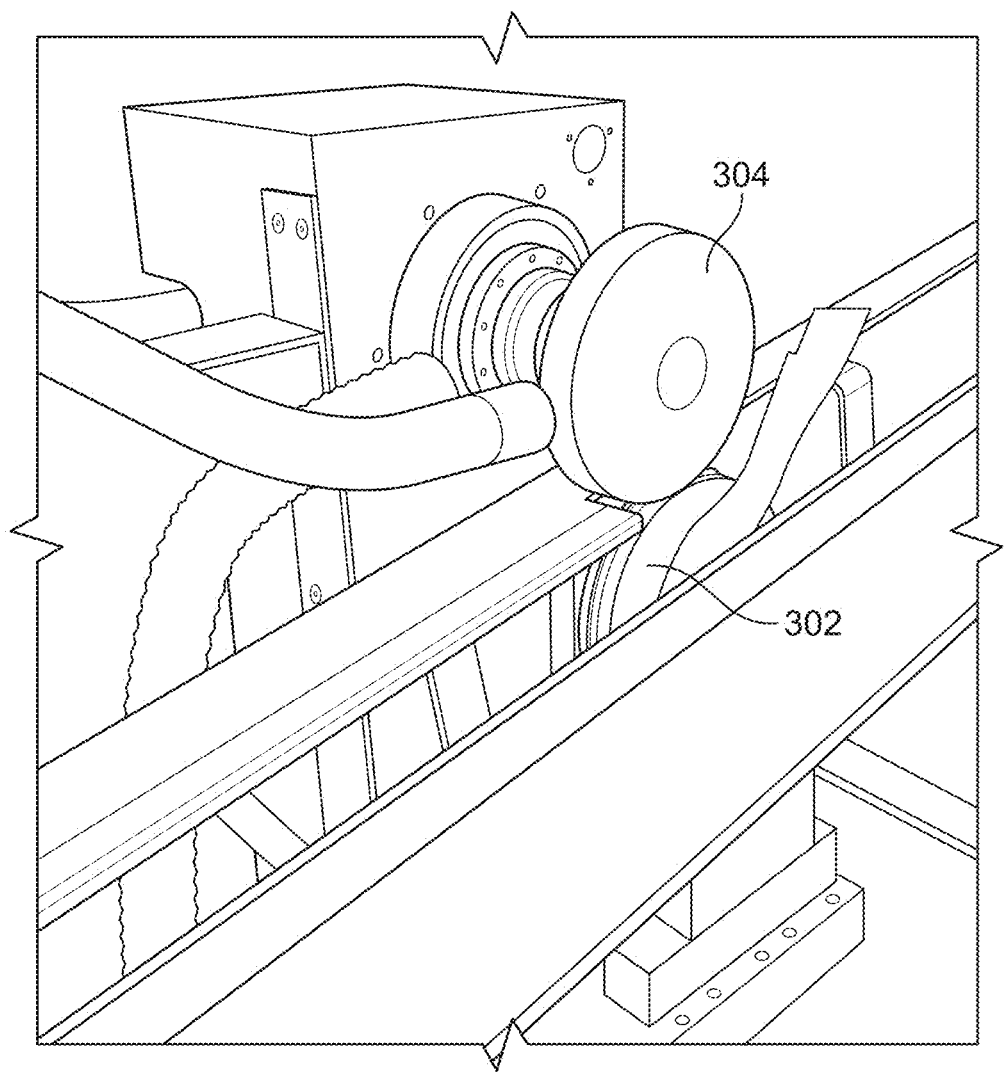
FIG. 17A is a perspective view of a rotary ultrasonic welding apparatus in accordance with the present invention.
Figure 18:
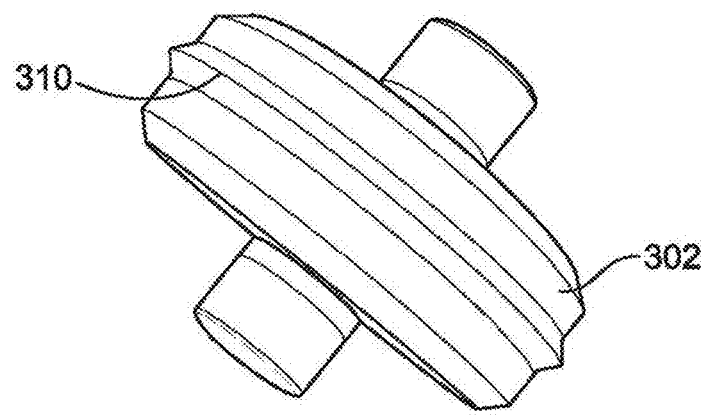
FIG. 18 is a perspective view of a rotary ultrasonic anvil in accordance with the present invention.
Figure 19:
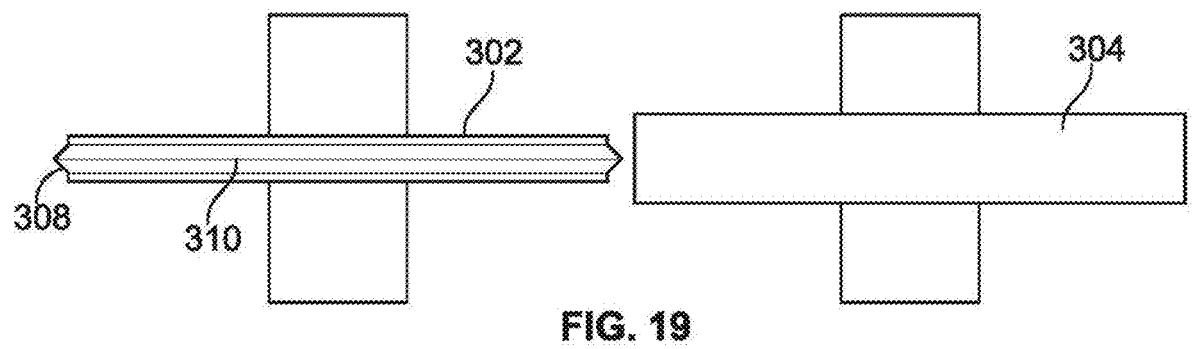
FIG. 19 is a plan view of a rotary ultrasonic anvil and horn in accordance with the present invention.

The rotary ultrasonic reshaping step of the present invention includes the plastic corrugated blank 100 being run in an ultrasonic device 300 illustrated in FIG. 17A. The ultrasonic device 300 includes an anvil 302 and a horn 304 (see e.g., FIGS. 17-19). The horn 304 imparts ultrasonic energy into the blank 100, thereby enabling the anvil to form a shaped score into the material. In extreme instances, the device 300 can weld the inner and outer sheets 102 and 104. Alternatively, the anvil 302 can impart the ultrasonic energy to the blank 100. Both the horn 304 and the anvil 302 can rotate about an axis.

Figure 17B:
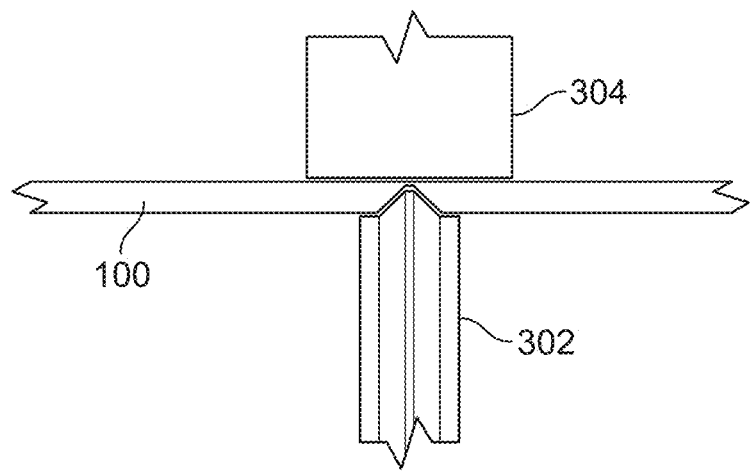
FIG. 17B is a plan view of a rotary ultrasonic welding horn and anvil forming a score line in a plastic corrugated blank.

The anvil 302 is shown having a central raised portion or projection 310 along a contacting surface of the anvil. The raised portion 310 is used to form the score lines 138. In effect, the plastic in the blank 100 reshapes around the projection 310 during the scoring operation to have a generally V-shaped cross-sectional profile as illustrated in FIG. 17B. It has been found that an angle 308 on the raised center portion 310 of the anvil 302 in the range of 90° to 120°, with a preferred angle 308 of about 110°, will provide the desired score lines 138 using rotary ultrasonic reshaping.

It has also been found that for the step of creating score lines 138 using rotary ultrasonic reshaping, a frequency in the range of 20 kilohertz is preferred. For creating the pre-sealed areas 124, 128 or 132 (when using ultrasonic devices) for the glue tab 126, fourth side wall panel area 128 and the major and minor flap slots 142, frequencies in the range of 15, 20, or 40 kilohertz are suitable.

Figure 8:
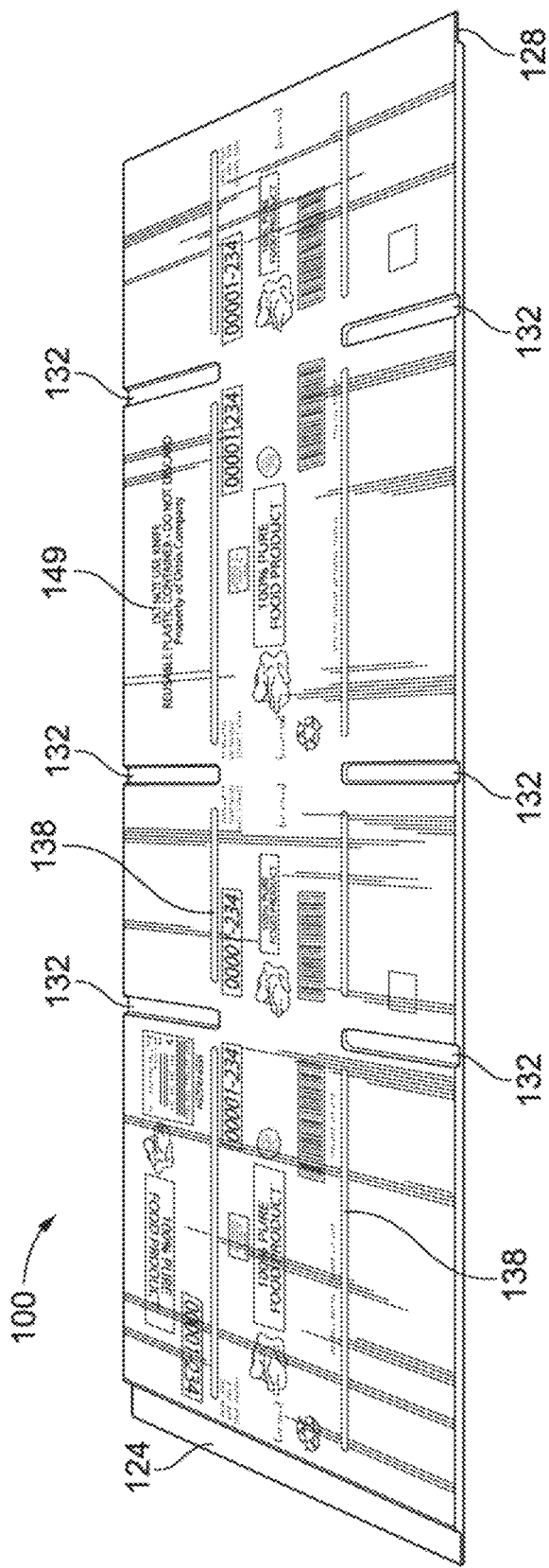
FIG. 8 is a perspective view of a plastic corrugated blank printed with indicia in accordance with the present invention.

The blank 100 can be printed upon if desired as shown in FIGS. 8 and 9. Printing can be done at any convenient step in the process. Printing can be done with silk screen, flexographic, digital, or any other suitable printing process. Printed indicia 140 on the blank 100 can include product information for products stored in the box, Department of Transportation required information, bar coding, or any other desired indicia.

After pre-sealing, the blank 100 can be die cut on any conventional corrugated die cut equipment, including quick set, clam shell, rotary or flatbed die cutting machines. The blank 100 is die cut in the areas having flattened segments 132 that have been pre-sealed where the major and minor flap slots 142 are desired (see FIGS. 9 and 10). The slots 142 are cut in the direction of the flutes 106. The slots 142 separate the flaps 146, 148 from each other. As shown in FIG. 10, the die cut slots 142 are narrower than the pre-sealed areas 132, leaving a sealed edge 144 around each slot 142. The pre-sealing of the slot areas 132 results in a sealed edge 144 that is more consistent than those formed in die cutting without pre-sealing. The die cut process also forms the glue tab 126. Alternatively, the major and minor flap slots 142 may also be cut or formed during the crushing and sealing operation described above. The die cut process also forms fold lines 123 separating the middle section of the blank 100 into the four side panels 125, 127, 129, and 130.

After being die cut, the blank 100 is folded so that the glue tab 126 is bonded to the edge area 128 of the fourth side wall panel 130, and the major and minor flaps 146, 148 are aligned or coplanar with the respective side wall panels 125, 127, 129, 130. A stack 244 of such glued blanks 100 is shown in FIG. 34.

Figure 11:
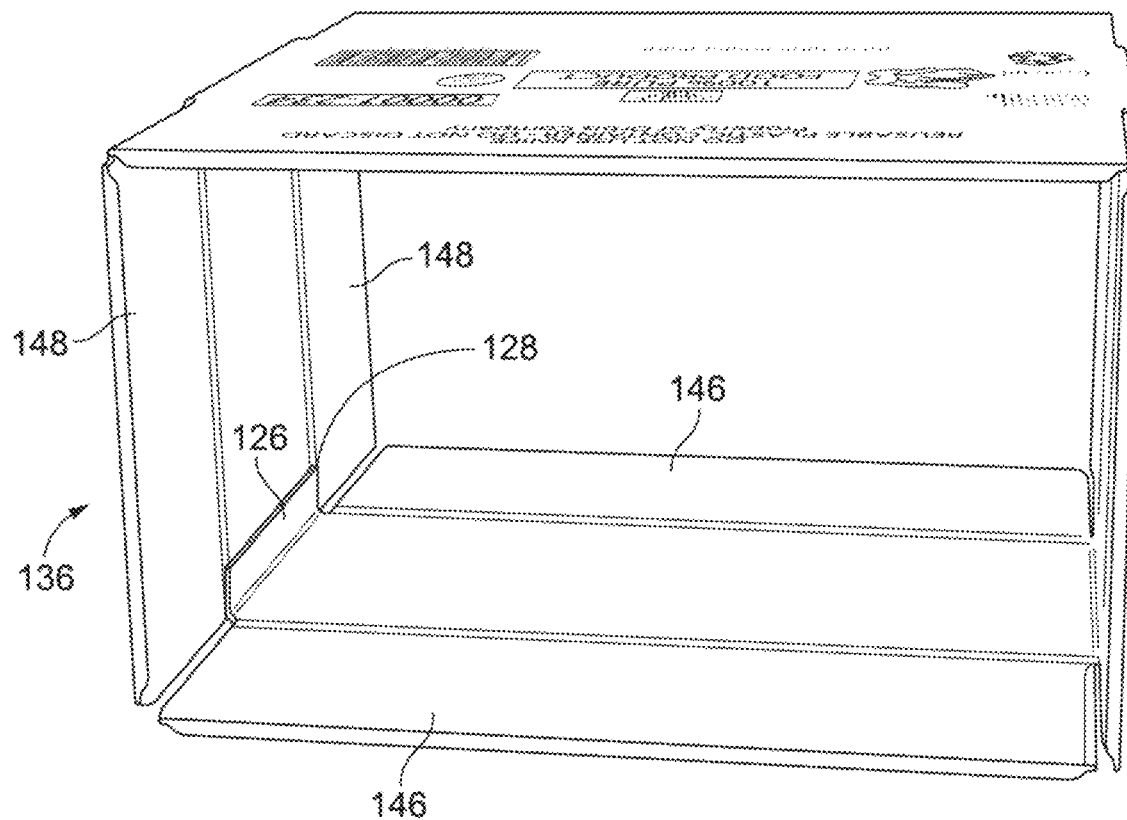
FIG. 11 is a perspective view of a plastic corrugated box constructed in accordance with the present invention.

The stack 244 is placed into a box converter to make a completed box. A partially completed box 136 is shown in FIG. 11. After opening the box 136 as shown in FIG. 11, the flaps are later folded to form a bottom and top of the box (the top flaps are typically folded after loading the box with the product being packaged). As set forth above, the present invention can also be used to form half slotted containers (i.e., open top boxes having only bottom flaps) as well as other types of boxes having different shapes.

Figure 21:
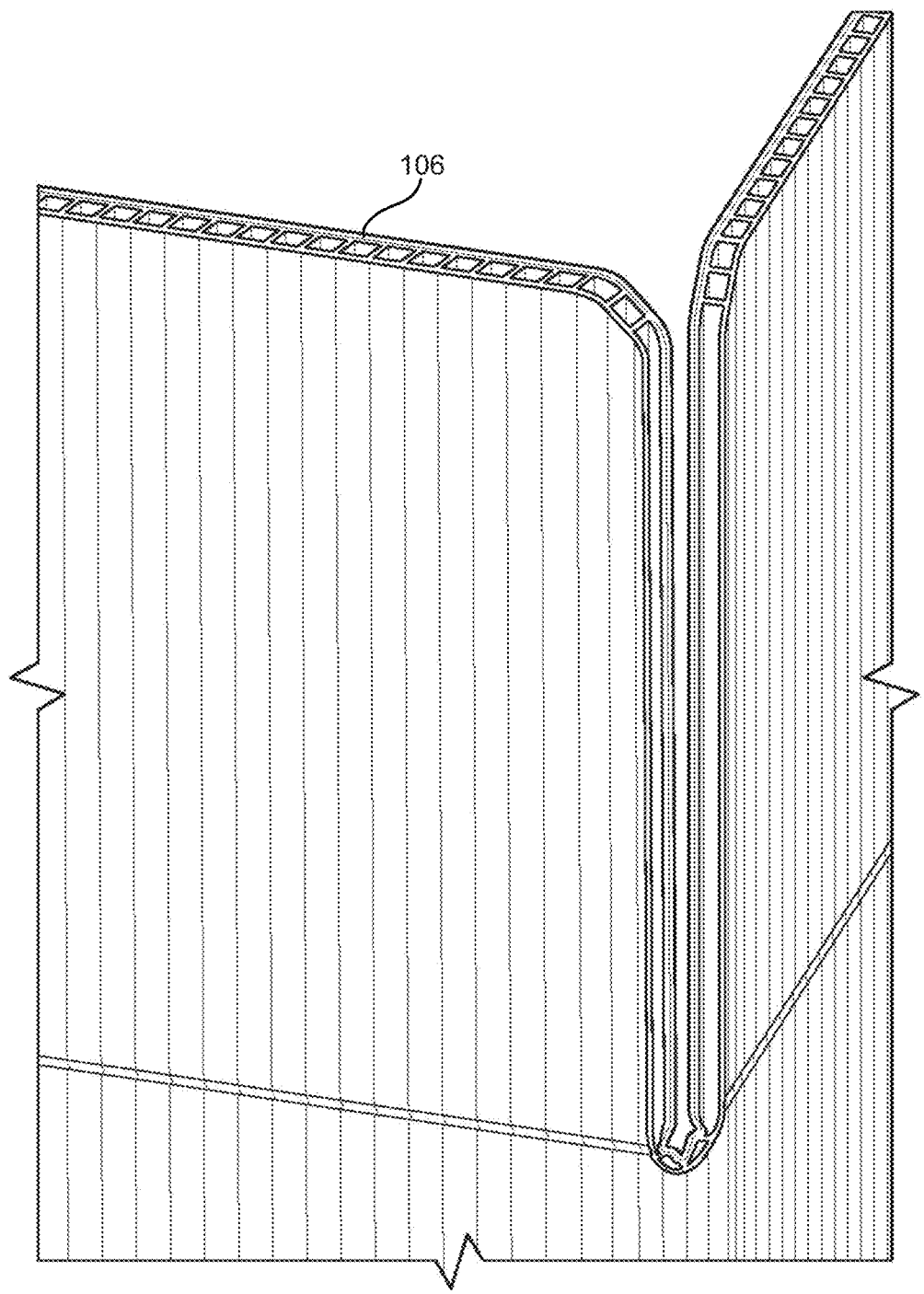
FIG. 21 is a perspective view of a corner of a plastic corrugated container with the edges of the flaps having unsealed open flutes.
Figure 23:
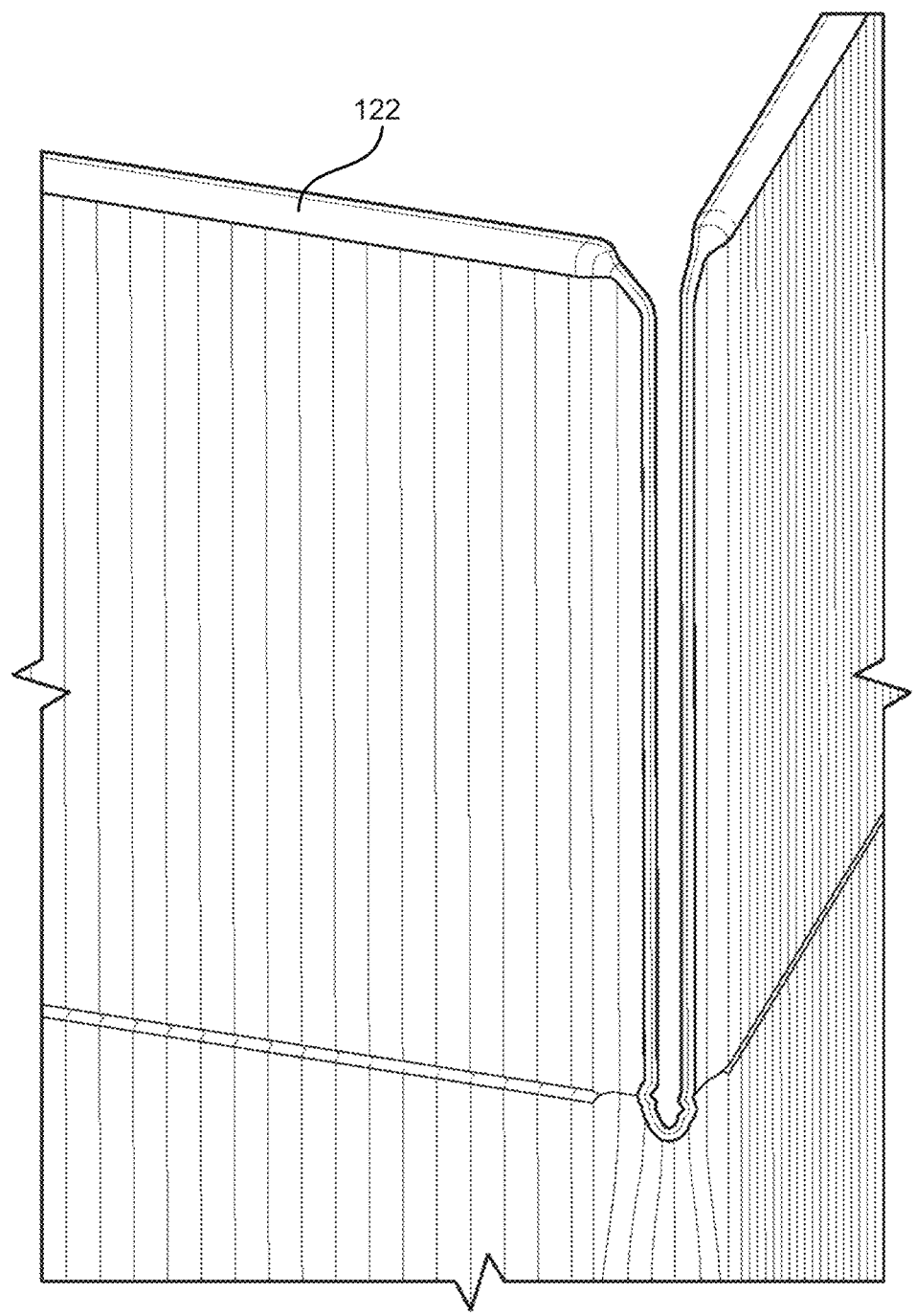
FIG. 23 is a perspective view of a corner of a plastic corrugated container with the edges of the flaps having a smooth seal.

FIGS. 21-23 provide a comparison of the outer edges of prior boxes with the current invention. FIG. 21 shows a first flap and a second flap of a box with edges that have not been sealed. Instead, the flaps have open edges showing the openings formed between the flutes 106. Open edges allow debris and liquid to enter the flutes 106 and contaminate the box for further use. Moreover, it would be difficult, if not impossible, to clean such boxes (especially using any automated process). FIG. 22 shows a first flap and a second flap having edges 107 that were sealed using heat and pressure to weld the edges together. This is typically accomplished during a die cut process. These edges are sharp, requiring those handling the boxes to wear gloves and other protective clothing. FIG. 23 shows a first flap and a second flap having a smooth rounded seal 120 in accordance with an aspect of the present invention. While the edge 120 of FIG. 23 is shown as being rounded, it can be flat or another shape (such as those shown in FIG. 20) as long as the box is sealed to a smooth edge at the typical human contact points. Additionally, the slot area between the flaps had been pre-sealed as discussed above, and has a smoother edge than the slot area of the die cut sealed box shown in FIG. 22.

FIG. 17B illustrates forming the score line 138 in the blank 100 using the ultrasonic horn 304 and anvil 302. As shown in cross-section, the projection 310 on the anvil 302 forms a V-shaped section into the bottom of the blank 100. It has been found that by manipulating certain variables associated with this process (e.g., the gap between the anvil 302 and the horn 304, the speed of the blank with respect to the anvil 302 and horn 304, the frequency or energy of the ultrasound, and the profile of the projection) that the resulting score line can be as strong or weak as desired for a particular use. For example, to create a score line with no or little memory (i.e., to form a limp flap), decrease the gap and speed of the blank and increase the frequency of the ultrasound. In contrast, to form a score line having a lot of memory (or spring-back), increase the gap and speed, and decrease the frequency. A multitude of variations in the flap memory or lack thereof are possible by gradually increasing or decreasing some or all of these variables.

The present invention is designed to handle various problems that may be encountered during some of the pre-sealing operations that can result in formation of an unacceptable box. For example, excess molten plastic may be formed during a pre-sealing operation. To accommodate this, the present invention provides a mechanism for managing the molten plastic, and directing it where to go. Additionally, the pre-sealing operation can encounter problems due to trapped air (i.e., between the ribs in the flutes) which can form bubbles and blowout holes as the pre-sealed areas are flattened. To fix this problem, air escape holes can be provided in the blank prior to the pre-sealing operation.

To direct molten plastic, the present invention contemplates contacting the areas to be pre-sealed with a surface having some shape (e.g., peaks and valleys) that directs the molten plastic to particular areas. For pre-sealing using a rotary ultrasonic device, this can be accomplished by providing a ridged pattern on one or both of a rotary anvil and horn.

Figure 24:
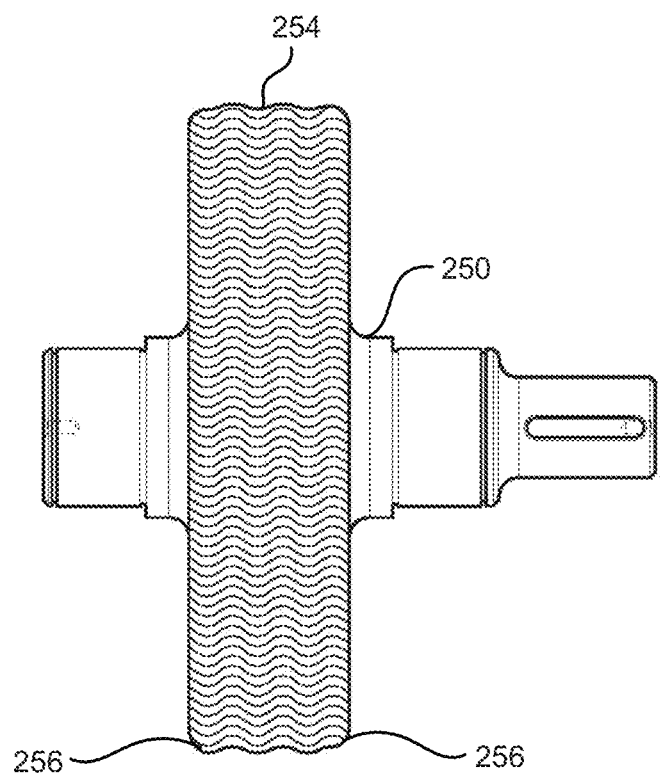
FIG. 24 is a front plan view of a rotary ultrasonic device anvil having an undulating, ridged contacting surface for forming a pre-sealed area on a plastic corrugated blank.
Figure 25:
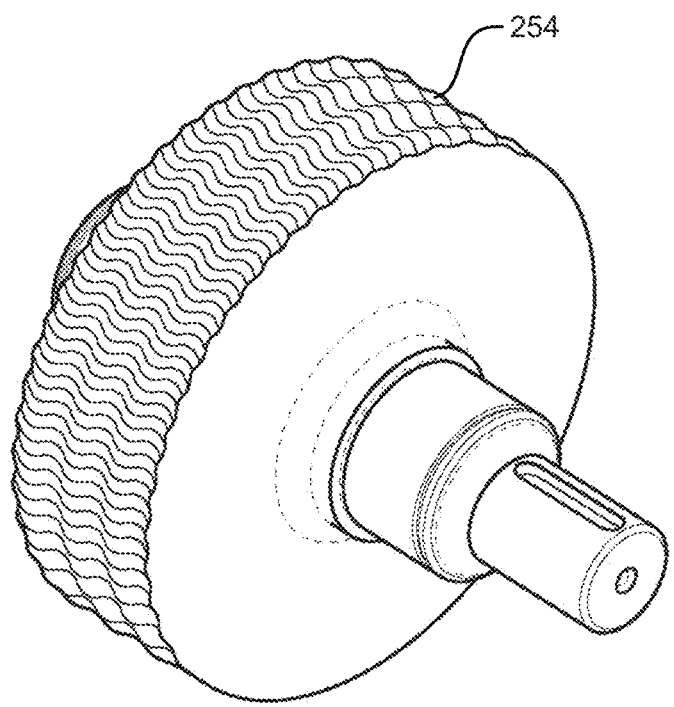
FIG. 25 is a perspective view of the rotary ultrasonic device anvil of FIG. 24.
Figure 26:
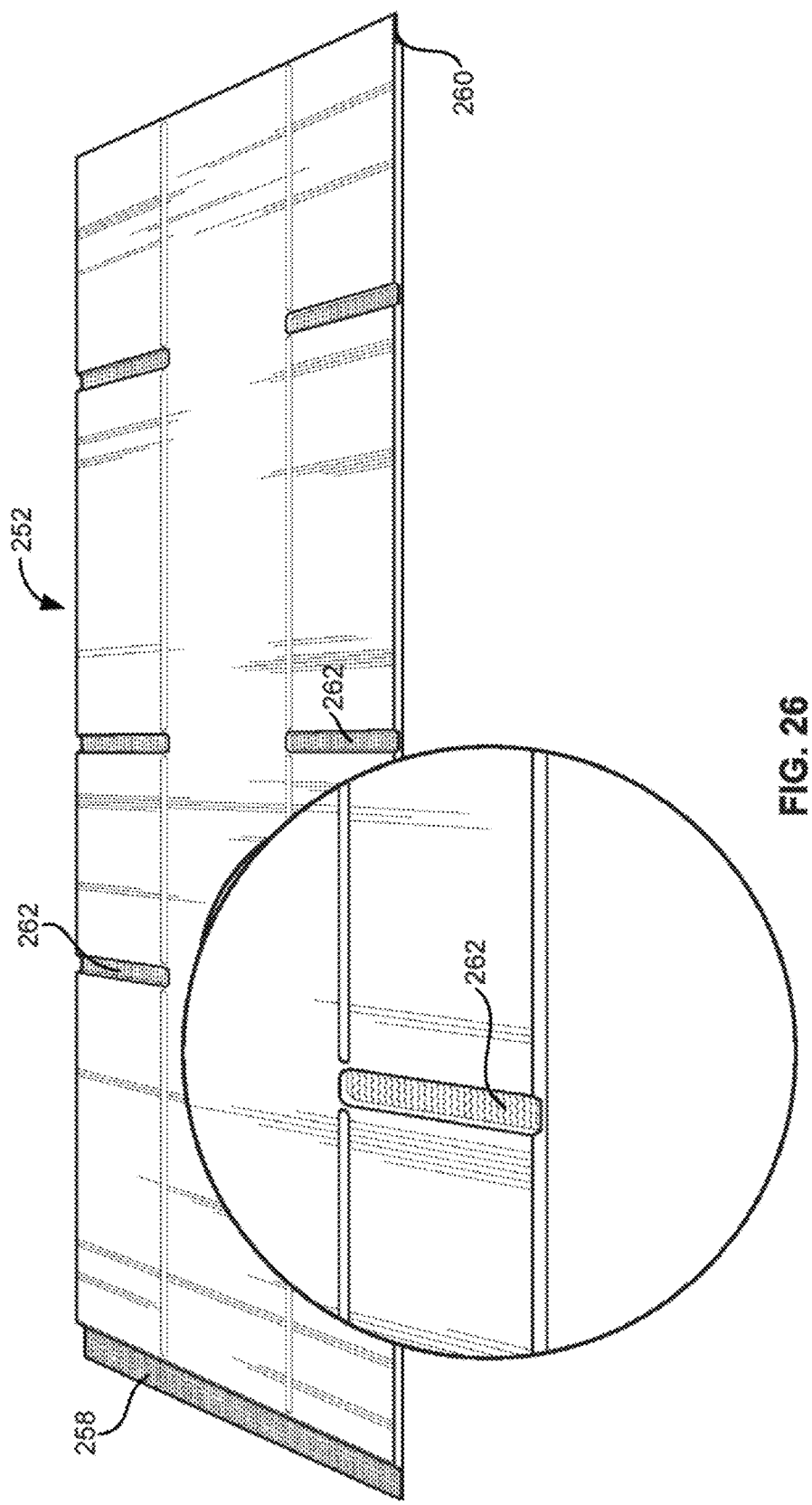
FIG. 26 is a perspective view (with an enlarged section) of a blank having a plurality of pre-sealed segments formed by the anvil of FIG. 24.
Figure 27:
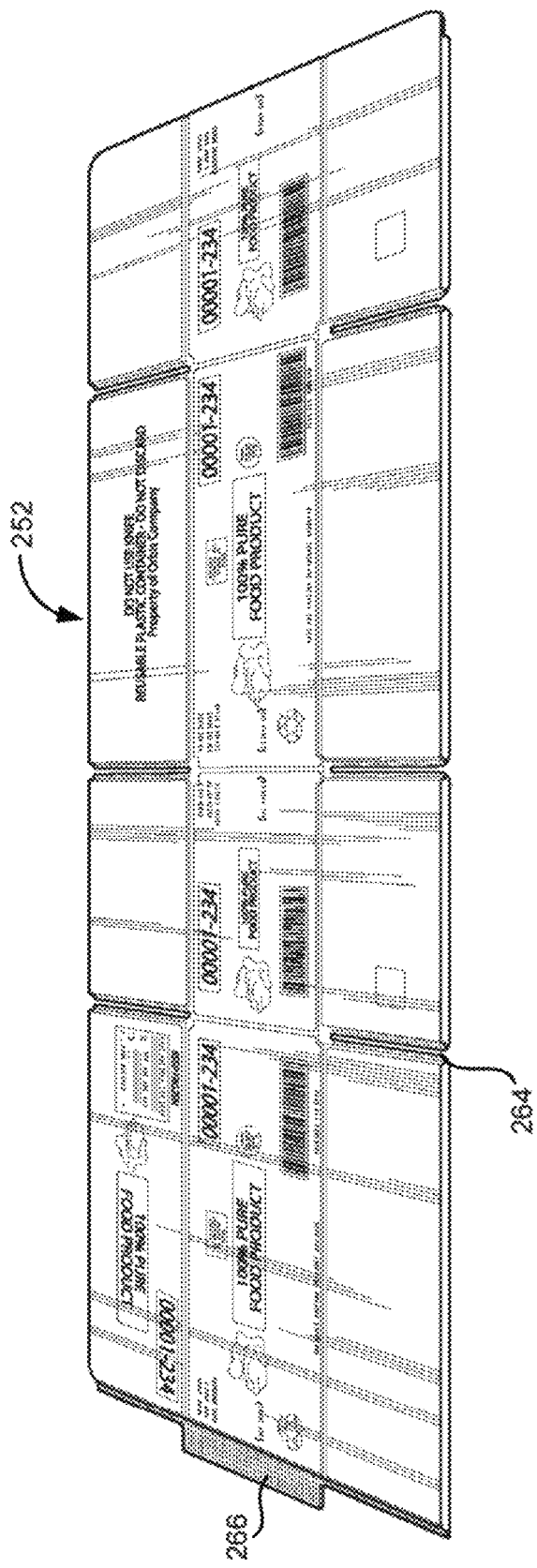
FIG. 27 is a perspective view of a blank having a plurality of pre-sealed segments formed by the anvil of FIG. 24 with a plurality of flap slots cut in the pre-sealed segments.

FIGS. 24 and 25 show a rotary ultrasonic anvil 250 in the form of a roller for use in pre-sealing portions of a corrugated plastic blank 252 (the blank 252 is shown in FIGS. 26-27). The anvil 250 includes an outer contacting surface 254 having an undulating, ridged pattern. The anvil 250 is utilized to contact the top or bottom surface of the blank 252 (depending on the area being pre-sealed) during a pre-sealing operation (in contrast, a smooth anvil and horn were utilized for the embodiment of FIGS. 2-10). The anvil 250 cooperatively works with a rotary ultrasonic horn (identical or similar to the horn 304 used for forming the score lines 138), which is also in the shape of a roller. The horn typically has a smooth outer surface (although in some embodiments, both the horn and the anvil can include a contacting surface having some structure or pattern). The horn is aligned or registered with the anvil 250 and contacts an opposing side of the blank 254. Again, while the horn typically provides the ultrasonic energy, either of the horn or anvil 250 can be configured to provide the necessary ultrasonic energy to accomplish the task. As shown, the contacting surface 254 of the anvil 250 has slightly rounded corners 256. This eliminates a sharp edge that could damage the plastic corrugated material during pre-sealing.

The horn and anvil 250 contact the blank 252 on the ends 258, 260 of the blank 252 for (later) formation of a glue tab and pre-sealed fourth side panel area, and at the slot locations to form pre-sealed segments 262. The horn and anvil 252 are each mounted on a camming mechanism which separates and brings them together at the proper locations on the blank 252 (more than one horn/anvil combination can be used in the forming apparatus).

As illustrated in FIG. 26, the pre-sealed areas 258 and 262 are shown having an undulating ridged pattern from contacting the anvil 252 (the horn and anvil 250 are reversed for pre-sealing the end 260—thus the lower surface will have the undulating ridged pattern in that area). The excess molten plastic formed from pre-sealing the corrugated plastic is directed by the pattern 254 on the anvil 250 and forms the ridges of the pattern on the surface of the blank 252. As shown in FIG. 27, a portion of this pattern may remain after cutting the slots 264 and glue tab 266.

Figure 30:
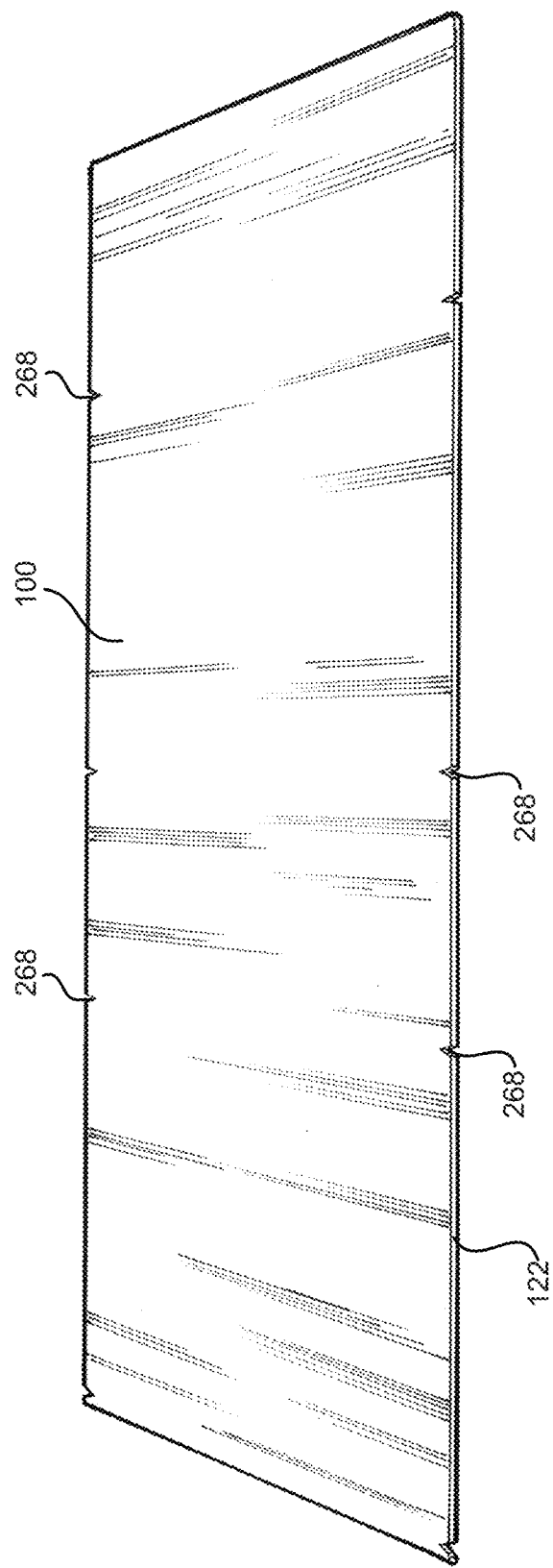
FIG. 30 is a perspective view of a blank with a plurality of air escape holes positioned at locations for pre-sealing.
Figure 31:
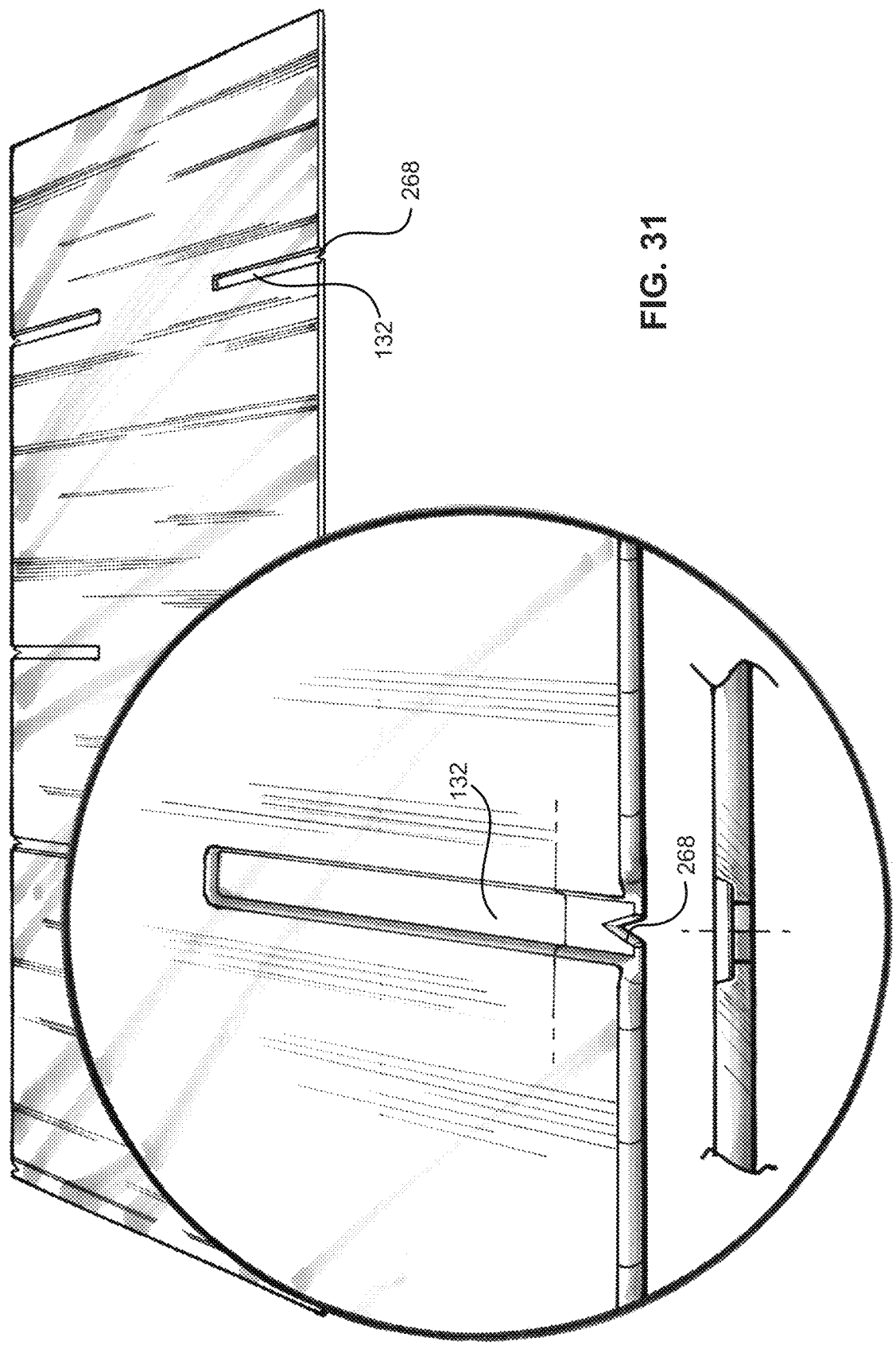
FIG. 31 is a perspective view of a blank with a plurality of escape holes and a plurality of pre-sealed segments (with an enlarged portion)

FIGS. 30 and 31 illustrate use of an air escape hole during the formation process. A plurality of V-shaped cut outs 268 are made to the smooth sealed edges of the blank 100 at locations that are to be pre-sealed as shown in FIG. 30. These cut-outs are also called "bird-bites" because of their V-shape. Making these cut outs 268 in the sealed edge allows air in the pre-sealed areas (e.g., 132) an escape path when the area is being crushed or flattened. Each cut out 268 goes all the way through the flutes that are being crushed. A flattened V-shaped cut 268 remains after the pre-sealing operation as shown in FIG. 31. While the cut outs 268 are shown as V-shaped, other shapes (e.g., an arcuate shape) can be used.

The cut outs 268 also help provide a place for molten plastic to go (in addition to or possibly in place of the ridged ultrasonic device described above) during the pre-sealing process. Without the cut outs 268, molten plastic will often squeeze out and migrate past the plane of the smooth edge seal during the crushing process. The cut out 268 is positioned in the area of the pre-seal 132 that is later cut away to form the slot 142. Accordingly, it does not appear in the completed box.

While FIGS. 30 and 31 show the pre-sealed area 132 having a smooth upper surface, these areas can also be formed using the ridged anvil 250 as discussed above. In this embodiment, the upper surface will have the undulating ridges (or other pattern) shown in FIG. 24, along with the V-shaped cut out 268.

In a typical pre-sealing operation, the blank 100 or 252 has a thickness of 0.140 inches. To form the pre-sealed areas the horn and anvil are spaced a distance of 0.013 inches apart. After the pre-sealed areas pass through the horn and anvil, they are flattened to a thickness of 0.052 inches.

Figure 36:
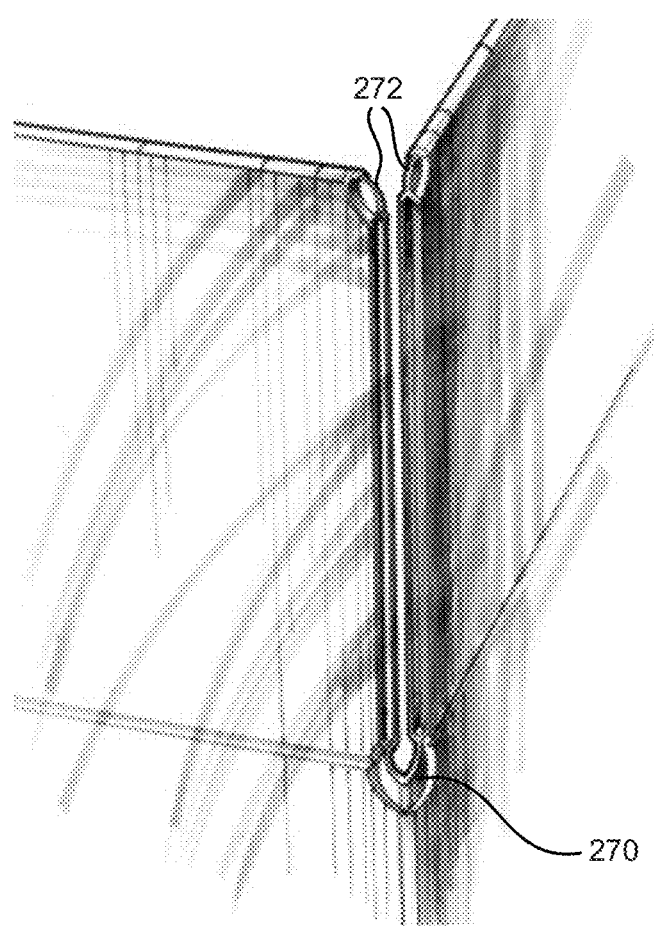
FIG. 36 is a perspective view of a corner of a plastic corrugated container with a first sealed portion and a second sealed portion; and, FIG. 37 is a perspective view of a paper corrugated blank with a "window frame" of trim material.

In accordance with another embodiment, only a minimal amount of sealing is done in the slot area. Because the slot is cut in the direction of the flutes 106, an existing natural barrier is provided along the sides of the slot. That is, the adjacent flute, or next flute over, provides a wall along the length of the slot that prevents contaminants from collecting or entering the area between the outer sheets of the corrugated plastic material. The only areas that require sealing are the very end of the slot (which will have open flutes) and (possibly) the top of the slot near the smooth sealed edge. FIG. 36 shows a flap slot that has a small sealed portion 270 at the end of the slot, and small sealed portions 272 on the corner of each flap defining the top of the slot. The bottom and top sealed portions 270, 272 can be sealed using heat and pressure or ultrasonic sealing. This approach is possibly lower in capital investment than the other approaches discussed herein.

Figure 35:
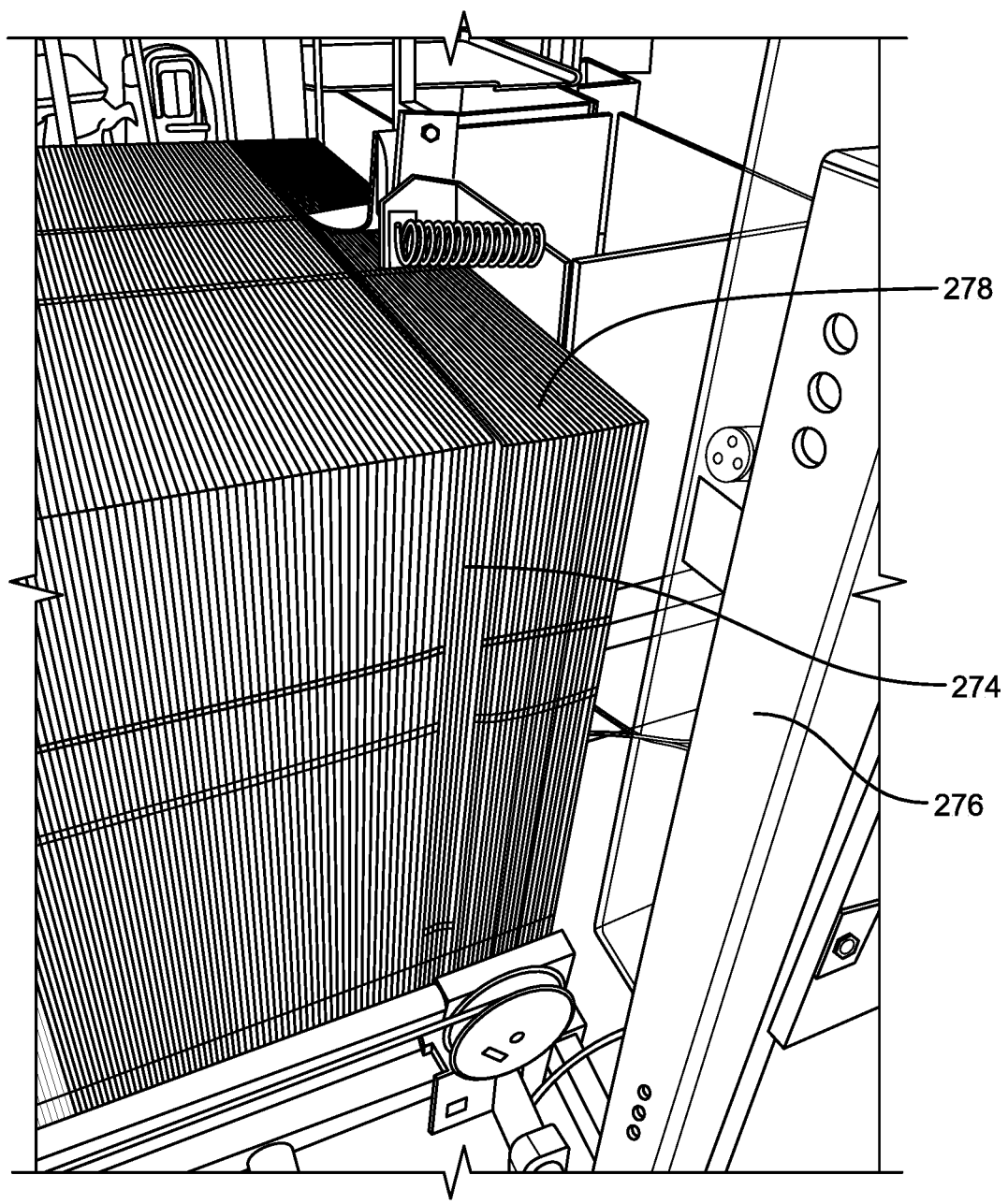
FIG. 35 is a perspective view of a plurality of corrugated paper blanks and a plurality of corrugated plastic blanks in a box converting apparatus.

FIG. 35 shows a plurality of plastic corrugated blanks 274 (formed in accordance with the present invention) in a box converting apparatus 276. The plastic corrugated blanks 274 are intermingled with paper corrugated blanks 278.

Figure 37:
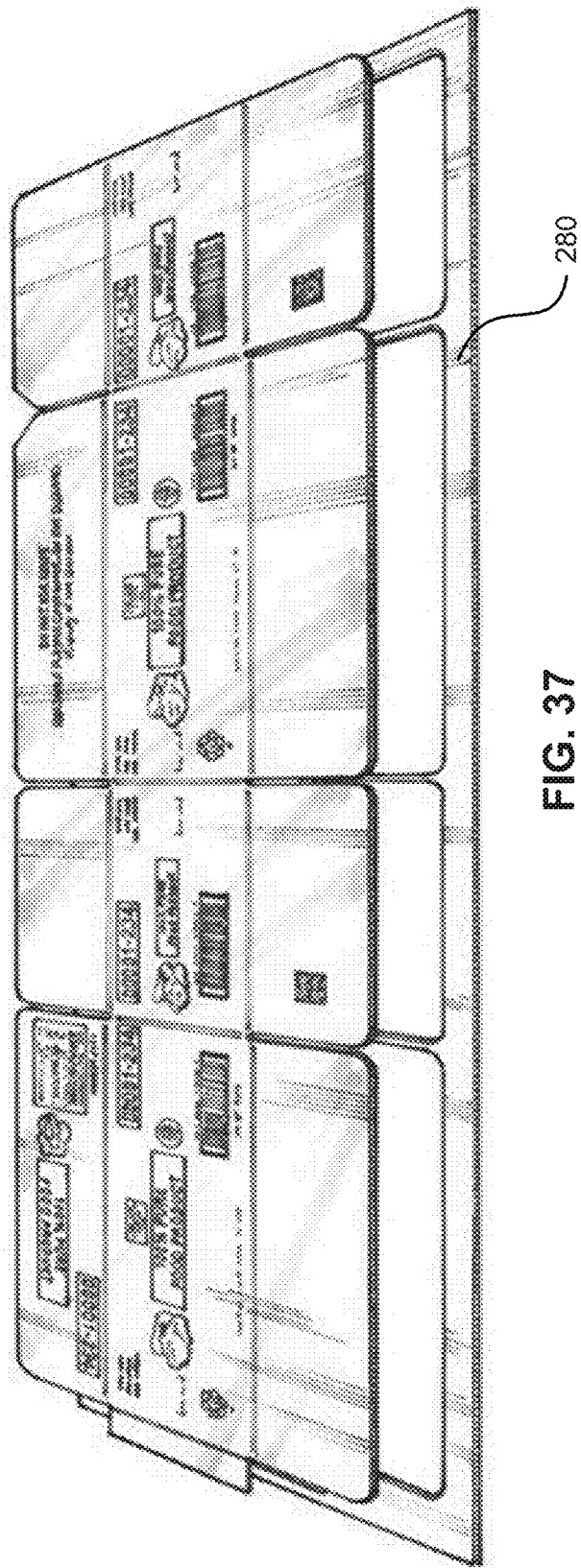

Prior to the present invention, when die cutting paper or plastic corrugated boxes, the conventional process used a blank that is slightly larger than the (eventual) die cut box. The die cut process would cut out the entire perimeter of the box (and all cut out portions), leaving a "window frame" of trim material 280 around the perimeter as shown in FIG. 37. When die cutting using rotary or flatbed die cut equipment, the window frame 280 is used to pull the blanks through the equipment and is then stripped away. In the present invention, the top and bottom edges of the blank are not cut away and instead are provided a smooth seal. Thus, the present process does not have the wasted "window frame" material.

While the term "horn" is typically used to describe the part of the system that emits the ultrasonic energy, it is understood that in any of the embodiments that ultrasonically reshape and/or weld the corrugated plastic material, either the horn or the anvil can emit the ultrasonic energy.

Figure 38:
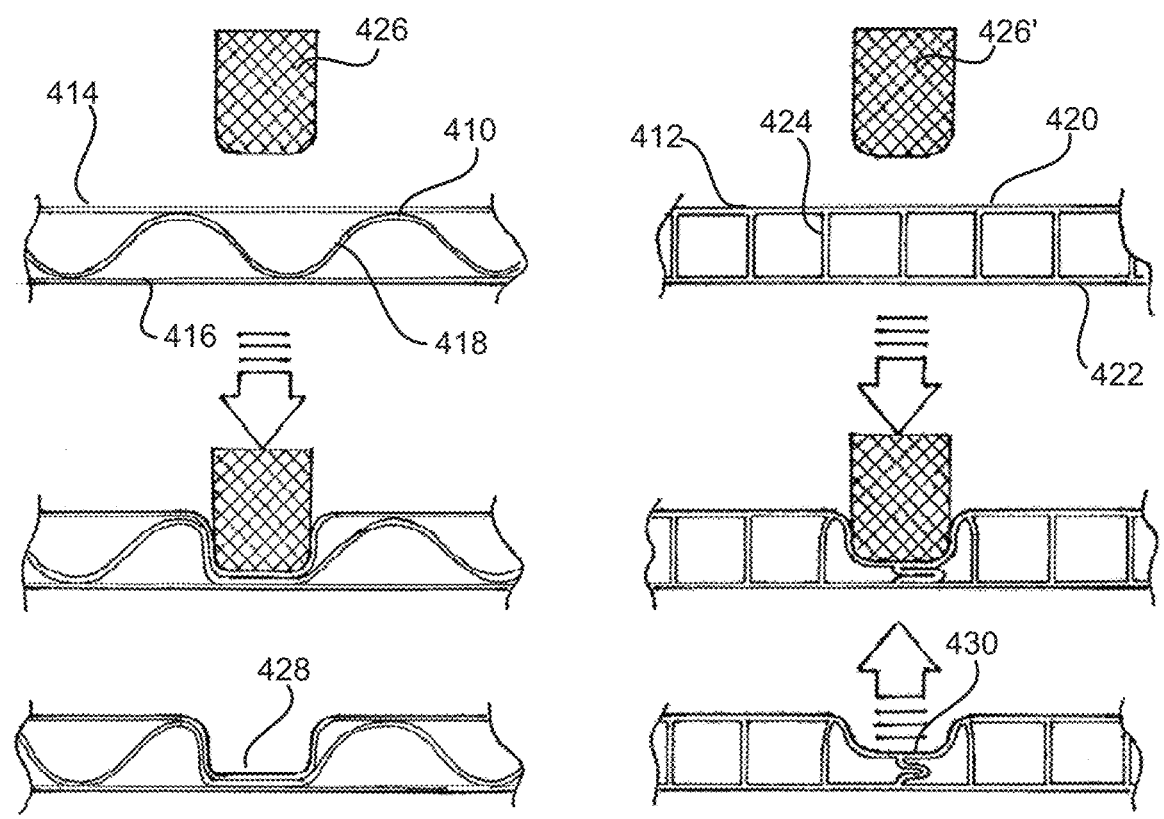
FIG. 38 is a series of side-by-side cross-sectional views of a scoring rule of a die board forming a conventional fold line in a paper corrugated material and a plastic corrugated material, respectively.

Formation of Fold Lines Between Side Wall Panels:

Conventional converting of corrugated material utilizes scoring rules in a die board to impart body scores during a die cutting process to form a blank for a box or container. The body scores act as fold lines between side wall panels and become the box corners when the box is opened and erected. FIG. 38 provides a side-by-side illustration of a conventional body scoring operation of a paper corrugated material 410 (left side of Figure) and a plastic corrugated material 412 (right side).

The paper corrugated material 410 includes a first outer layer 414 of paper, a second outer layer 416 of paper and third layer 418 of paper having a wave pattern between the first outer layer 414 and the second outer layer 416. The plastic corrugated material 412 includes a first outer layer 420 of plastic, a second outer layer 422 of plastic and a plurality of plastic flutes 424 (e.g., parallel ribs) between the first outer layer 20 and the second outer layer 422. The plastic corrugated material 412 can be formed in an extrusion process.

In the box forming operation, a scoring rule 426 of a die cutting board presses down on the paper corrugated material 410 and forms a fold line 428. With a paper corrugated material, the fold line 428 will stay compressed and provide a place where the material will consistently fold. Accordingly, when conventional paper corrugated boxes are erected the boxes will consistently fold on the body score lines to form sharp corners as illustrated in FIG. 39a.

When the scoring rule 426' is used on a plastic corrugated material, it will also compress the material to form a fold line 430. However, if the scoring rule 426' lands on (or partially on) a flute 424, the compressed flute 424 will immediately begin to return to its original position (via an inherent memory in the plastic). A comparison with fold line 428 of the paper corrugated material 410 shows that the fold line 430 of the plastic corrugated material 412 is not as well defined. This is because the compressed rib 424 in the fold line 430 is returning to its uncompressed shape after the scoring rule 426' is removed due to the memory of the plastic. In fact, depending on the type of plastic and the thickness of the flute 424, the fold line 430 formed in this manner could virtually disappear. As shown, the body score 430 is created in the direction of the flutes 424 (i.e., parallel with the flutes 424 in the material 412).

In view of the memory in the plastic, boxes formed from plastic corrugated material using the same equipment and process for forming paper corrugated material, will not consistently fold on the imparted body score lines as illustrated in FIG. 39b. Instead, because of the memory and profile of plastic corrugated blanks, the boxes will frequently find their own fold lines in the area of least resistance—typically between flutes adjacent to the intended fold location (i.e., score). In fact, actual body fold lines can wander back and forth (e.g., on either side of a compressed flute) between the imparted body score (i.e., the intended fold line) and unintended fold lines as the box is folded at the area adjacent the imparted body score because it is the path of least resistance. Such wandering fold lines 430 are illustrated in the plastic corrugated stack of blanks 432 in FIG. 41.

FIG. 40 shows an open box 434 formed from a blank 436 of corrugated material having one end connected to the other end (via a manufacturer's joint—not specifically shown) and initially folded flat. While the box 434 can be formed manually, due to the great number needed, they are usually formed in an automated converting apparatus.

Figure 41:
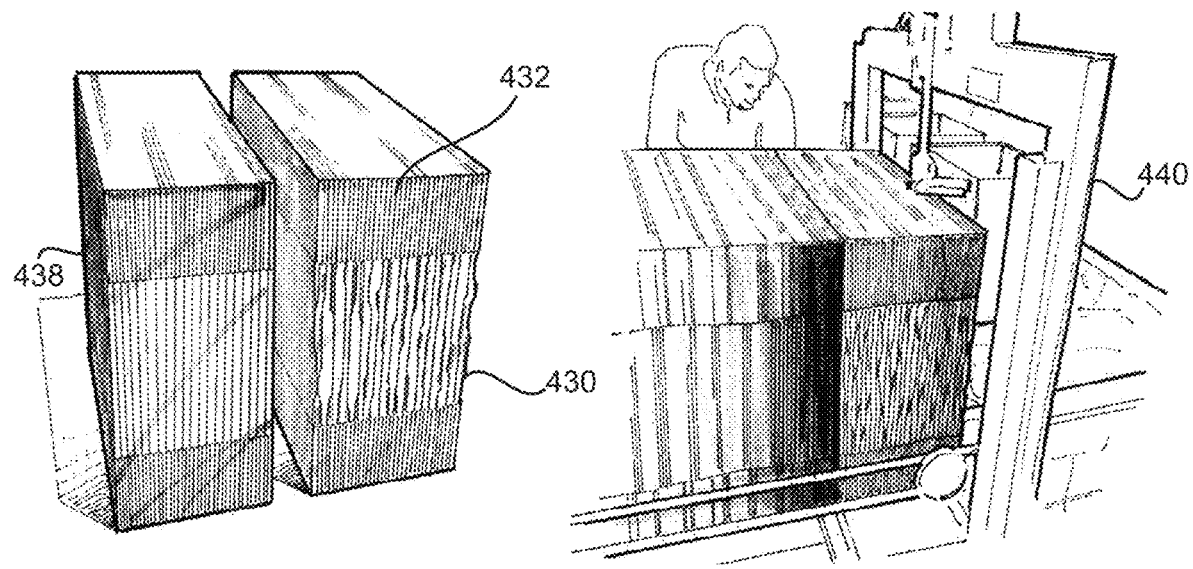
FIG. 41 is a perspective views of a stack of plastic corrugated blanks having fold lines formed in a conventional manner next to a stack of paper corrugated blanks, both alone and in a box converting apparatus.

Referring to FIG. 41, a stack of paper corrugated blanks 438 is shown next to the stack of plastic corrugated blanks 432. FIG. 41 also shows both stacks of blanks 438, 432 in a conventional box forming apparatus 440.

As is evident when looking at the edges of the collapsed blanks, the stack of plastic corrugated blanks 432 have fold lines 430 (made in a conventional manner) that slightly waver back and forth. When this occurs, the resulting boxes may not have square corners. This can be problematic when trying to fit product into the box. Additionally, the force required to open the boxes can be in excess of what the automated box erecting equipment can typically handle. The end result is boxes that will not work in typical automated packaging lines.

Figure 42:
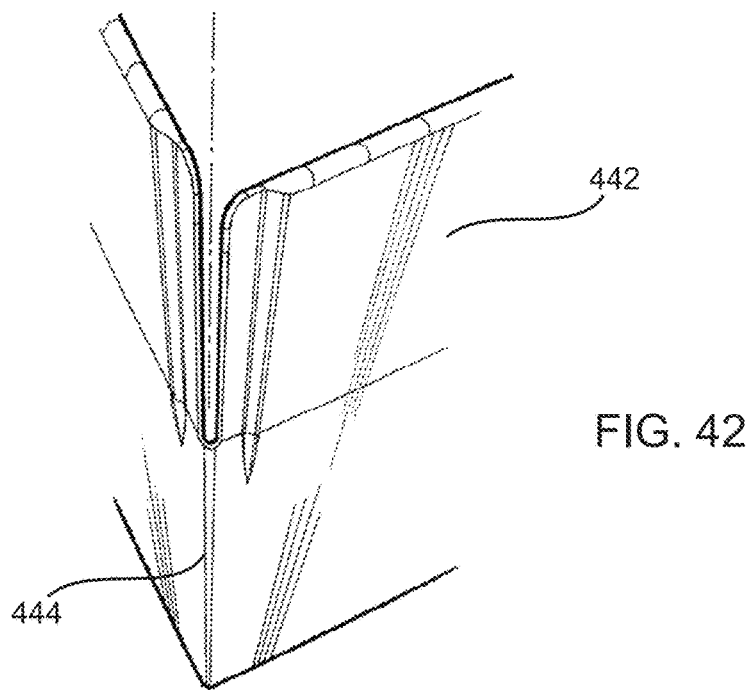
FIG. 42 is a perspective view of a corner of a corrugated plastic box having a fold line in accordance with the present invention.

A plastic corrugated box 442 having a sharp, distinct corner 444 is (partially) shown in FIG. 42. The corner 442 follows a fold line made in accordance with the present invention.

Figure 43:
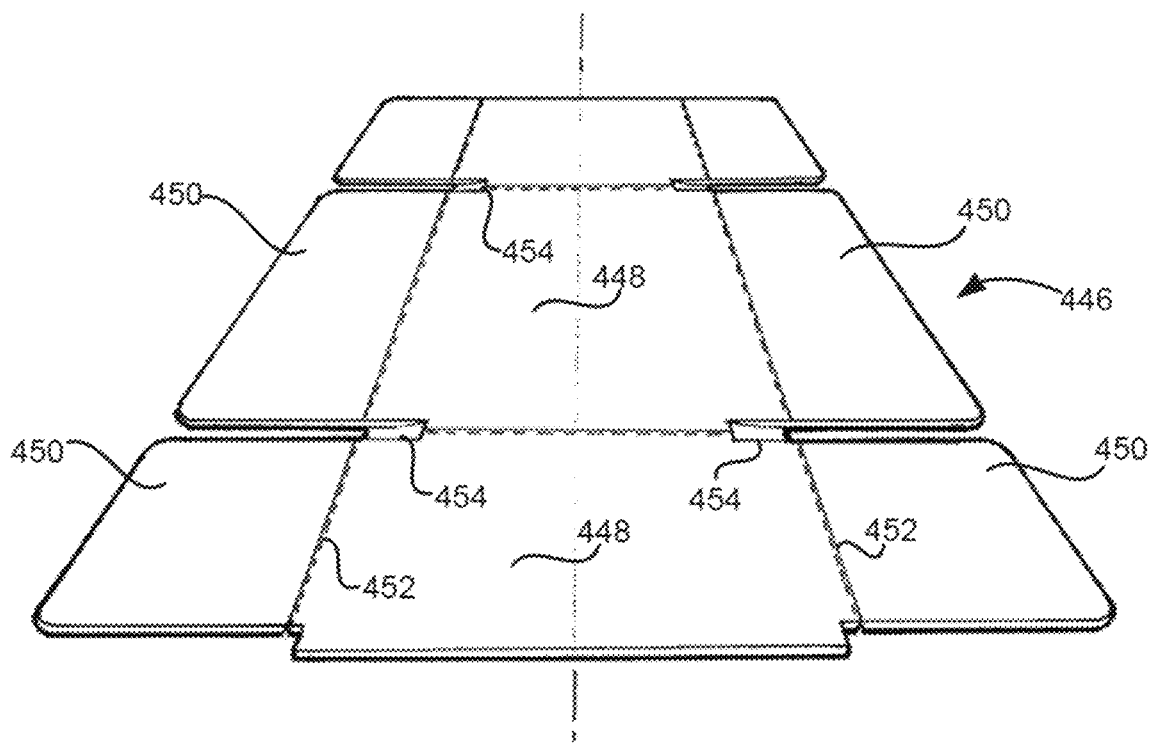
FIG. 43 is a perspective view of a partial blank for a corrugated plastic box having a fold line in accordance with the present invention.
Figure 44:
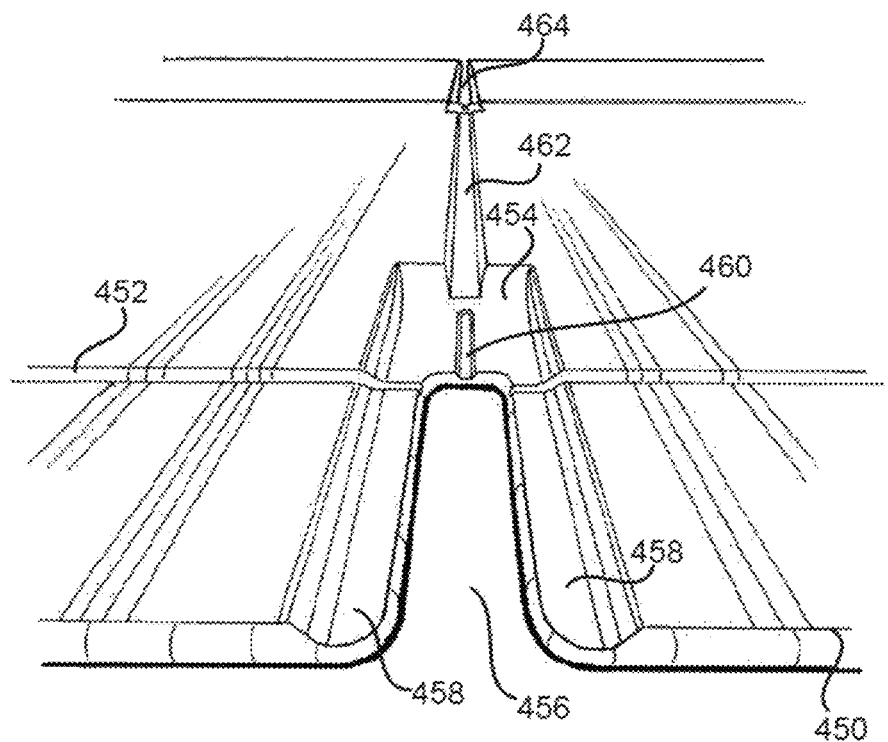
FIG. 44 is a perspective close up view of a fold line in a blank for a plastic corrugated box in accordance with the present invention.
Figure 45:
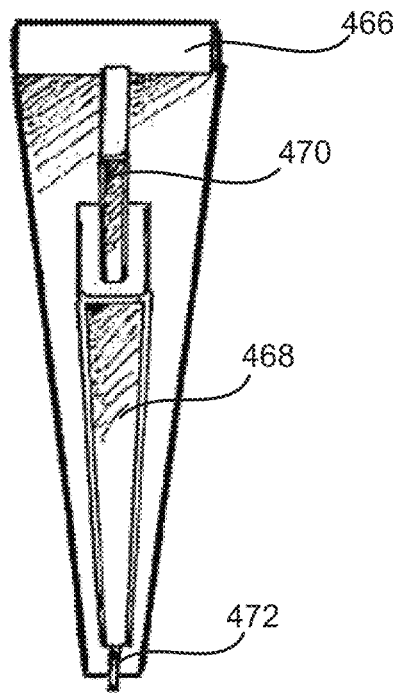
FIG. 45 is a perspective view of a scoring rule for creating a fold line in a plastic corrugated blank in accordance with the present invention; and, FIG. 46 is a side view of a scoring rule for creating a fold line in a plastic corrugated blank in accordance with the present invention.
Figure 46:
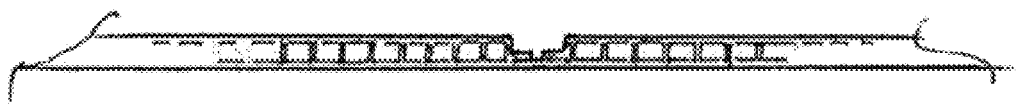

Referring to FIGS. 43-45, an embodiment of the body score and process for forming a body score in accordance with the present invention will be described. FIG. 43 shows a partial blank 446 of a plastic corrugated material for forming a box. The blank 446 includes a plurality of side wall panels 448 (while three are shown before the figure is cut-off, typical boxes include four side wall panels) having flaps 450 extending from each end of the side wall panels 448. The flaps 450 are separated by the side wall panels by score lines 452. The score lines 452 can be formed, for example, as described in U.S. Publication No. 2015/0174849 referenced above and disclosed herein.

Referring to FIGS. 43 and 44, the blank 446 includes a plurality of welded portions 454 proximate the ends of the blank (i.e., in the area of the blank 446 that will become the top and bottom four corners of the sides of the box). The welded portions 454 can be formed by crushing and welding the components of the corrugated plastic material (i.e., outer layers and flutes). This can be done, for example, using either rotary or plunge ultrasound apparatuses, or by heat and pressure as described in U.S. Publication No. 2015/0174849. The welded portion 454 can be part of a larger welded area that also includes the area between adjacent flaps 450. Slots 456 between the flaps 450 can be cut in this area leaving welded portions 458 along the side edges of each flap 450 as shown in FIG. 44. Because these portions are crushed and welded together, the plastic "resets" its memory and does not revert back to its prior shape.

Using a scoring rule, a first segment or part 460 of a body score or fold line can be formed in the welded portion 454. This first segment 462 can be connected to a second, middle segment 462 of the body score that extends through the middle portion between two side wall panels 448. A third segment 464 can be formed in a second welded portion 454 at the other end of the blank 446. Typically, the middle portion (where the second segment 462 of the fold line extends) is not welded. However, additional welded portions could be added to this area (and therefore segments of the fold line can be in such additional welded portions) as needed.

A scoring rule 466 for forming the segments 460, 462 and 464 of the fold line is shown in FIG. 45. As is evident in both FIG. 44 and FIG. 45, the middle segment 462 of the fold line as well as the middle segment 468 of the scoring rule 466 is wider than the first and third segments 460, 464 of the fold line, and the first and third segments 470, 472 of the scoring rule 466. That is, the scoring rule 466 used to impart the body score for the fold lines of the four corners of the box is best done with a wider rule (i.e., middle segment 468) in the main body of the box and a narrower rule (i.e., first and third segments 470, 472) in the crushed and welded portions 454. The wider scoring rule 468 in the main body is used to have the best chance of landing on and crushing the flute 424 in the body score between the first and third segments 470, 472. The narrower scoring rules 470, 472 in the welded portions 454 forms a clearly defined fold line in the area that is now solid plastic. An 8-pt rule can be used for the main body of the box and a 4-pt rule can be used in the welded portions.

Boxes produced using the method described have body scores in all four corners of the box that have a clearly defined fold line at the top and bottom of each body scored fold line. By crushing and welding the areas of the score line there is no longer a potential path of less resistance near where the box is supposed to fold. Instead, the boxes fold as the imparted score line as intended because the immediately adjacent areas (of the segment in the welded portions) are now solid plastic.

The present invention can be used for regular slotted containers (RSC) or a half slotted containers (HSC), as well as other container configurations.

Many modifications and variations of the present invention are possible in light of the above teachings. It is, therefore, to be understood within the scope of the appended claims the invention may be protected otherwise than as specifically described.

We claim:

1. A plastic corrugated box comprising:
    a sheet of plastic corrugated material having a first outer layer, a second outer layer and a plurality of flutes extending between the first outer layer and the second outer layer;
    the sheet having a plurality of panels defining side walls of the box and a plurality of fold lines between adjacent panels of the plurality of panels defining side walls wherein the sheet includes a first plurality of welded portions each having a width wherein the first outer layer, second outer layer, and plurality of flutes extending between the first outer layer and second outer layer are welded together proximate a top edge of the plurality of panels and a second plurality of welded portions each having a width wherein the first outer layer, second outer layer, and plurality of flutes extending between the first outer layer and second outer layer are welded together proximate a bottom edge of the plurality of panels defining side walls and wherein each of the plurality of fold lines between adjacent panels of the plurality of panels defining side walls includes a first portion in one of the first plurality of welded portions proximate the top edge and each having a width less than the width of each of the first plurality of welded portions and a second portion in one of the second plurality of welded portions proximate the bottom edge and each having a width less than the width of each of the second plurality of welded portions and wherein each of the plurality of fold lines includes a third, middle portion extending between the first portion of the fold line and the second portion of the fold line in an un-welded area of the sheet.

2. The plastic corrugated box of claim 1 wherein the width of each first portion of the plurality of fold lines is less than a width of each third portion of the plurality of fold lines.

3. The plastic corrugated box of claim 2 wherein the width of each second portion of the plurality of fold lines is equal to the width of each of the first portion of the plurality of fold lines.

4. The plastic corrugated box of claim 2 wherein the width of each first portion of the plurality of fold lines is 4 point rule and the width of each third portion of the plurality of fold lines is 8 point rule.

5. The plastic corrugated box of claim 1 further comprising a plurality of bottom flaps wherein each of the plurality of bottom flaps extends from the bottom edge of one of the plurality of panels defining side walls.

6. The plastic corrugated box of claim 5 further comprising a plurality of top flaps wherein each of the plurality of top flaps extends from the top edge of one of the plurality of panels defining side walls.

7. The plastic corrugated box of claim 6 wherein each of the first plurality of welded portions extends onto an edge portion of adjacent top flaps.

8. The plastic corrugated box of claim 5 wherein each of the second plurality of welded portions extends onto an edge portion of adjacent bottom flaps.

9. The plastic corrugated box of claim 1 wherein the box has four panels defining side walls.

10. The plastic corrugated box of claim 1 wherein the box is formed from a single blank of corrugated plastic material.

11. A plastic corrugated box comprising:
a first side wall panel formed from a corrugated plastic having a first outer layer, a second outer layer and a plurality of fluted between the first outer layer and the second outer layer;
a second side wall panel formed from a corrugated plastic having a first outer layer, a second outer layer and a plurality of fluted between the first outer layer and the second outer layer, the second side wall panel positioned next to the first side wall panel;
a first welded portion having a width proximate a first edge of a portion of the first side wall panel and a first edge of a portion of the second side wall panel wherein the first outer layer, second outer layer, and plurality of flutes extending between the first outer layer and second outer layer are welded together; and,
a first fold line between the first side wall panel and the second side wall panel having a first portion of the first fold line positioned in the first welded portion and having a width less than the width of the first welded portion and a second portion of the first fold line extending from the first welding portion into an unwelded portion between the first side wall panel and the second side wall panel.

12. The plastic corrugated box of claim 11 further comprising a second welded portion having a width proximate a second edge of a portion of the first side wall panel opposed from the first edge of the first side wall panel and a second edge of a portion of the second side wall panel opposed from the first edge of the second side wall panel wherein the first outer layer, second outer layer, and plurality of flutes extending between the first outer layer and second outer layer are welded together.

13. The plastic corrugated box of claim 12 wherein the first fold line includes a third portion positioned in the second welded portion and having a width less than the width of the second welded portion.

14. The plastic corrugated box of claim 11 wherein the width of the first portion of the fold line is less than a width of the second portion of the fold line.

15. The plastic corrugated box of claim 14 further comprising a third side wall panel positioned next to the second side wall panel, a third welded portion having a width proximate the first edge of the second side wall panel and a first edge of the third side wall panel, and a second fold line having a first portion positioned in the third welded portion and having a width less than the width of the third welded portion and a second portion extending from the first portion wherein the first outer layer, second outer layer, and plurality of flutes extending between the first outer layer and second outer layer of the third welded portion are welded together.

16. The plastic corrugated box of claim 15 further comprising a fourth welded portion having a width proximate the second edge of the second side wall panel and a second edge of the third side wall panel wherein the fold line includes a third portion positioned in the fourth welded portion and having a width less than the width of the fourth welded portion wherein the first outer layer, second outer layer, and plurality of flutes extending between the first outer layer and second outer layer of the fourth welded portion are welded together.

17. The plastic corrugated box of claim 16 wherein the width of the third portion of the second fold line is equal to the width of the first portion of the second fold line.

18. The plastic corrugated box of claim 11 further comprising a first bottom flap extending from the second edge of the first side wall panel and a second bottom flap extending from the second edge of the second side wall panel.

19. The plastic corrugated box of claim 18 further comprising a first top flap extending from the first edge of the first side wall panel and a second top flap extending from the first edge of the second side wall panel.

* * * * *